United States Patent
Kobashi

(10) Patent No.: US 8,165,338 B2
(45) Date of Patent: Apr. 24, 2012

(54) IMAGE PROCESSING APPARATUS AND CONTROL METHOD THEREOF

(75) Inventor: Kazufumi Kobashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 950 days.

(21) Appl. No.: 12/134,720

(22) Filed: Jun. 6, 2008

(65) Prior Publication Data

US 2008/0317299 A1 Dec. 25, 2008

(30) Foreign Application Priority Data

Jun. 21, 2007 (JP) ................................. 2007-164082

(51) Int. Cl.
*G06K 9/00* (2006.01)
(52) U.S. Cl. ........... 382/100; 382/112; 399/366; 705/67
(58) Field of Classification Search .................. 382/100, 382/112; 399/366; 705/67
See application file for complete search history.

(56) References Cited

U.S. PATENT DOCUMENTS

| | | | | |
|---|---|---|---|---|
| 7,334,078 B2 * | 2/2008 | Parry et al. | .................... | 711/100 |
| 7,344,078 B2 * | 3/2008 | Elliott et al. | ............. | 235/462.01 |
| 7,628,329 B2 * | 12/2009 | Tanaka et al. | .................. | 235/460 |
| 7,731,435 B2 * | 6/2010 | Piersol et al. | .................... | 400/62 |
| 7,809,156 B2 * | 10/2010 | Piersol et al. | .................... | 382/100 |
| 7,865,124 B2 * | 1/2011 | Piersol et al. | .................. | 399/361 |
| 2008/0003034 A1 * | 1/2008 | Ihara | .............................. | 400/62 |

FOREIGN PATENT DOCUMENTS

JP 2004-214831 7/2004

* cited by examiner

*Primary Examiner* — Aaron W Carter
(74) *Attorney, Agent, or Firm* — Fitzpatrick, Cella, Harper & Scinto

(57) ABSTRACT

Even when multiple document-data images are imposed on a sheet, a paper fingerprint registration can be performed securely with single processing and collation processing can be performed also after cutting of the sheet. An image forming apparatus according to the present invention, the image forming apparatus including: a imposition information acquisition unit acquiring imposition information specified for a sheet to perform acquisition of paper fingerprint; a paper fingerprint acquisition region calculation unit that calculates a region for the paper fingerprint acquisition according to the imposition information acquired by the imposition information acquisition unit; and a paper fingerprint information acquisition unit that acquiring region of paper fingerprint according to the region calculated by the paper fingerprint acquisition region calculation unit.

15 Claims, 40 Drawing Sheets

DIAGRAM SHOWING A METHOD
FOR OBTAINING $E_{2n-1} \times 1$

DIAGRAM SHOWING A METHOD FOR OBTAINING $E_{2n-1} \times 2$

IMAGE PROCESSING APPARATUS AND CONTROL METHOD THEREOF

BACKGROUND OF THE INVENTION

1. Field of the Invention

The present invention relates to an image processing apparatus and a control method thereof that can treat paper fingerprint (hereinafter, also called paper print) information.

2. Description of the Related Art

A paper is made of plant fibers with a diameter of about 20 to 30 microns entangled with each other. Random patterns are formed by the entanglement and these random patterns are different from one another sheet by sheet as same as fingerprints. Such a random pattern on the paper is called paper fingerprint information.

Since the paper fingerprint information is different sheet by sheet, if it is registered that "the original I issued is a paper having this paper fingerprint information", it is convenient afterward to discriminate between the "original" and a "counterfeit". Note that "a copy of the original" is naturally included in the counterfeits.

Japanese Patent Laid-Open No. 2004-214831 discloses a technique in which a region for paper fingerprint information acquisition is set to be a region apart by a predetermined distance from a reference position with a mark added to a paper to be an original as the reference position when the original is made. This patent document also discloses acquisition of the paper fingerprint information from a region set for paper fingerprint information acquisition. Further, this patent document discloses a technique for encoding the acquired paper fingerprint information to generate an encoded image and printing the generated encoded image on a paper to be the original.

Also, in the print-on-demand print industry, there is used a method to print document data on one sheet by a lay out (also called imposition) of multiple pages for a purpose of saving the number of output sheets. A final product is obtained by cutting the printed sheets with a cutter or the like. FIGS. 20 and 21 show an example of the printing method. In the description hereinafter, a printed material after the cutting is denoted by a final product. Symbol 1401 and Symbol 1402 show a sheet and a document data of one page, respectively. On the one sheet 1401 shown in FIG. 20 is laid out ten pages of the documents (ten pieces of the one page document data 1402). Marks 1403 shown in FIG. 20 for cutting are called register marks. FIG. 21 shows an example a diagram focused on one page document data. The final product is an area 1404 cut at the marks (register marks) 1403. Such a printing method is called multi-frame printing or multi-page printing, and a document data layout method used in such a printing method is called a multi-up imposition or multi imposition.

However, there are problems as follows, when the paper fingerprint technique and the multi-page printing are applied at the same time.

FIGS. 22 and 23 are examples of diagrams showing the problems.

First, the problem shown in FIG. 22 will be described. In FIG. 22, a sheet 1501 shows a multi-page imposition of one page document data areas 1502. A conventional paper fingerprint registration is processing performed for a sheet. That is, the paper fingerprint registration is carried out for the sheet 1501 shown in FIG. 22. Accordingly, the paper fingerprint to be registered is located at a random position 1503 as shown in FIG. 22 and the number of the paper fingerprints becomes also random. When a final product 1504 is obtained after cutting of this sheet 1501 as shown in FIG. 22, the final product may not include the registered paper fingerprint information as shown in the drawing and various processing such as original guarantee by the paper fingerprint information may become ineffective.

Next, another problem will be described with reference to FIG. 23. For solving the above problem, it can be devised that the paper fingerprint registration is carried out after preliminary cutting of the sheet 1501. However, this method becomes a very time-consuming process because the paper fingerprint registration needs to be carried out for each of the final products 1504. In an example shown in FIG. 23, ten times of reading processing in total by setting the 10 final products 1504 in a finger print reading apparatus continuously is necessary for carrying out the paper fingerprint registration for one sheet 1501.

SUMMARY OF THE INVENTION

For solving the above described problems, an image forming apparatus according to the present invention which ensures that a paper is an original on the basis of a paper fingerprint (feature of fibers) thereof by scanning the paper, the image forming apparatus comprising: an imposition information acquisition unit that acquires imposition information specified on a sheet to perform acquisition of paper fingerprint; a paper fingerprint acquisition region calculation unit that calculates a region for the acquisition of paper fingerprint according to the imposition information acquired by the imposition information acquisition unit; and a paper fingerprint information acquisition unit that detects and acquires a region of paper fingerprint in the region calculated by the paper fingerprint acquisition region calculation unit.

According to the present invention, it becomes possible to perform a paper fingerprint registration securely with single processing even when multiple pieces of document data are imposed on a sheet and also collation processing after cutting of the sheet can be performed without fail.

Further features of the present invention will become apparent from the following description of exemplary embodiments (with reference to the attached drawings).

DESCRIPTION OF THE EMBODIMENTS

In the embodiments according to the present invention to be described hereinafter, a paper fingerprint provides information used for discriminating whether a paper provided with a paper fingerprint is an "original" or a "counterfeit"

The paper fingerprint is formed by plant fibers with a diameter of about 20 to 30 microns entangled with each other, and the entanglement generates random patterns. Since these random patterns are different sheet by sheet as same as fingerprints, it is possible to ensure that a certain paper is an "original" by registering a paper fingerprint of the "original".

(Embodiment 1)

<Printing System>

Figure 1:
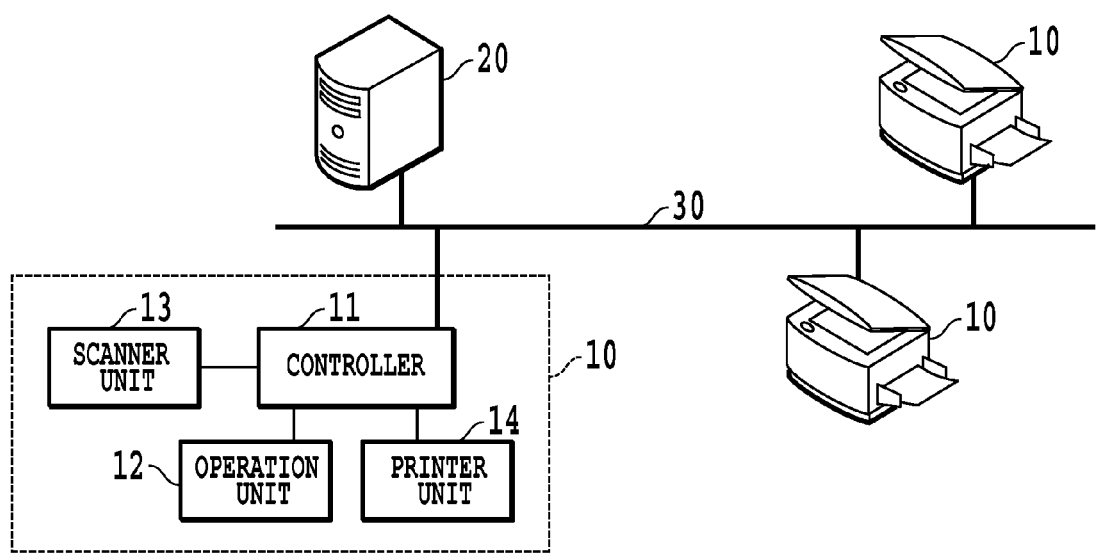
FIG. 1 is a diagram showing an example of a printing system including an image forming apparatus according to an embodiment 1 of the present invention.

FIG. 1 is a block diagram showing a printing system including an image forming apparatus according to an embodiment 1 of the present invention. In the printing system shown in FIG. 1, three image forming apparatuses 10 and a sever 20 are connected to a LAN 30. Although the three image forming apparatuses are connected to the printing system shown in FIG. 1, only one image forming apparatus and one sever may be connected to the system. Also, although the embodiment 1 uses a LAN for a connection method, the connection method for the embodiment 1 is not limited to this connection method. The connection method to be used in the embodiment 1 may be any network such as a WAN (public line), a serial transmission method such as a USB, a parallel transmission method such as Centronics or SCSI.

The sever 20 shown in FIG. 1 has a data storage function and a data management function. The sever 20 shown in FIG. 1 stores data transmitted from the image forming apparatus 10 via the LAN 30 or a WAN. Also, the sever 20 receives a data acquisition request from the image forming apparatus 10 via the LAN 30 or the WAN, and transmits the requested data to the image forming apparatus 10.

The image forming apparatus 10 includes a scanner unit 13 which is an image input device, a printer unit 14 which is an image output device, a controller 11 which controls operations of the whole image forming apparatus 10, and an operation unit 12 which serves as a user interface (UI).

<Image Forming Apparatus 10>

Figure 2:
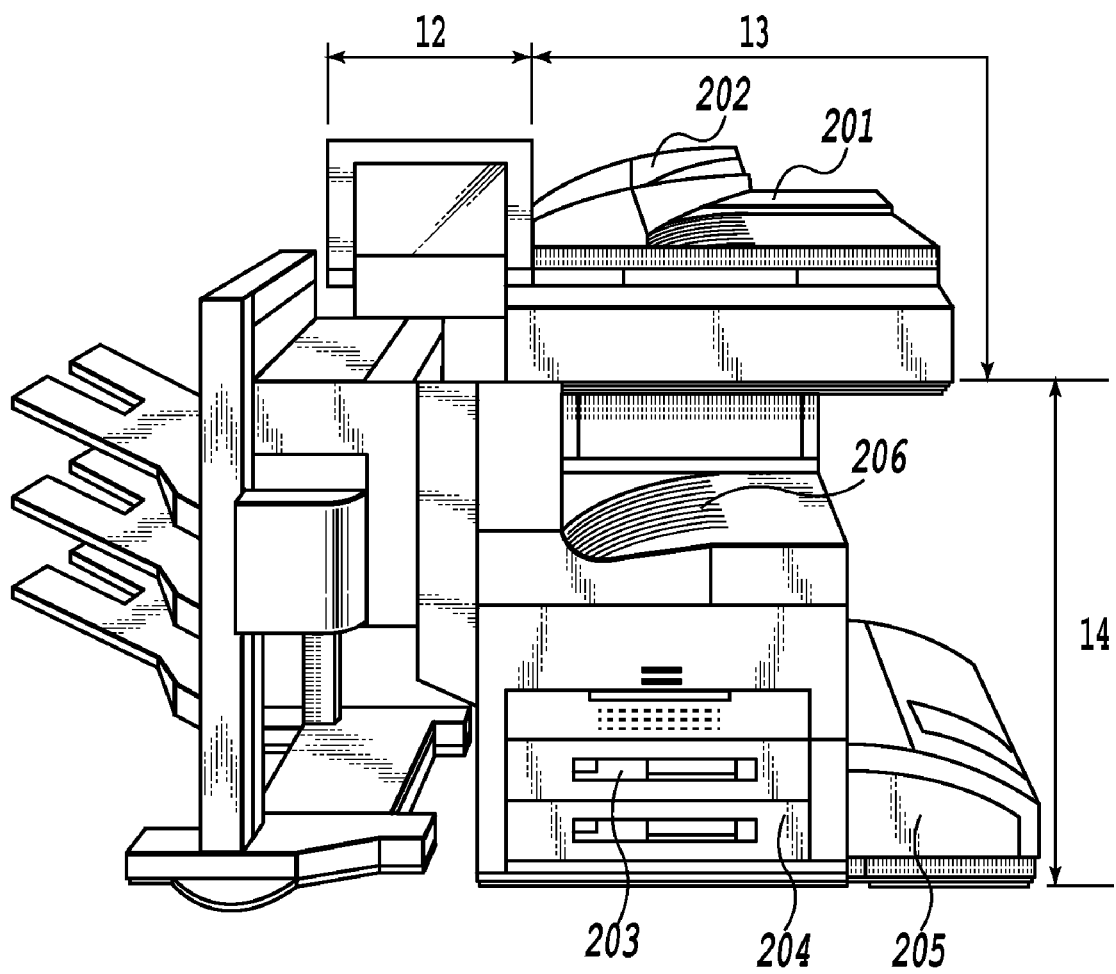
FIG. 2 is an external view of an input-output device of the image forming apparatus.

FIG. 2 shows an external view of the image forming apparatus 10.

The scanner unit 13 has a plurality of CCDs. If sensitivities of the CCDs differ from one another, even if the density of each pixel on a document is the same, each pixel will be recognized as having a different density. For this reason, in the scanner unit 13, a white plate (a uniformly white plate) is exposed and scanned first, and then an amount of the reflected light obtained by exposing and scanning is converted into an electrical signal, which is output to the controller 11. Here, as described below, a shading correction unit 500 in the controller 11 (refer to FIG. 5) recognizes differences among the sensitivities of the CCDs on the basis of the electric signal acquired from each of the CCDs.

Then, by utilizing these recognized differences in the sensitivities, the shading correction unit 500 corrects values of an electrical signal acquired by the scanning of an image on a document. Further, on receiving information regarding gain adjustment from a CPU 301 (refer to FIG. 3) within the controller 11 described below, the shading correction unit 500 performs gain adjustment according to this information. The gain adjustment is used to determine how the values of the electrical signal acquired by the exposing and scanning of the document are allocated to luminance signal values of 0 to 255. By this gain adjustment, the shading correction unit can convert the value of the electric signal acquired by the exposing and scanning of the document into a higher luminance signal value or into a lower luminance signal value.

The scanner unit 13 exposes and scans an image on the document and inputs the obtained reflected light to the CCDs, and thereby converts image information into an electrical signal. The scanner unit 13 further converts the electrical signal into a luminance signal composed of each of the R, G, and B colors and outputs this luminance signal as image data to the controller unit 11. The document is placed on a tray 202 of a document feeder 201. When a user enters a reading start instruction through the operation unit 12, the controller 11 gives the document read instruction to the scanner unit 13. On receiving this instruction, the scanner unit 13 feeds sheets of the document on the tray 202 of the document feeder 201, sheet by sheet, and performs a reading operation of the document. To read a document, instead of using automatic feeding performed by the document feeder 201, individual pages of the document may be placed on a glass panel (not shown in the drawing) and scanned by movement of an exposure unit.

The printer unit 14 is an image forming device to form image data received from the controller 11 onto a sheet. In the embodiment 1, an image forming method is an electro-photographic method using a photosensitive drum or a photosensitive belt. However, the image forming method of the present invention is not limited to the above method and can also employs, for example, an inkjet system that ejects ink through fine nozzle arrays to print an image on a sheet. Further, the printer unit 14 is provided with a plurality of sheet cassettes 203, 204, and 205 (refer to FIG. 2) that permit a user to select different sheet sizes or different sheet directions. Printed sheets are discharged to a discharge tray 206.

<Detailed Description of the Controller 11>

Figure 3:
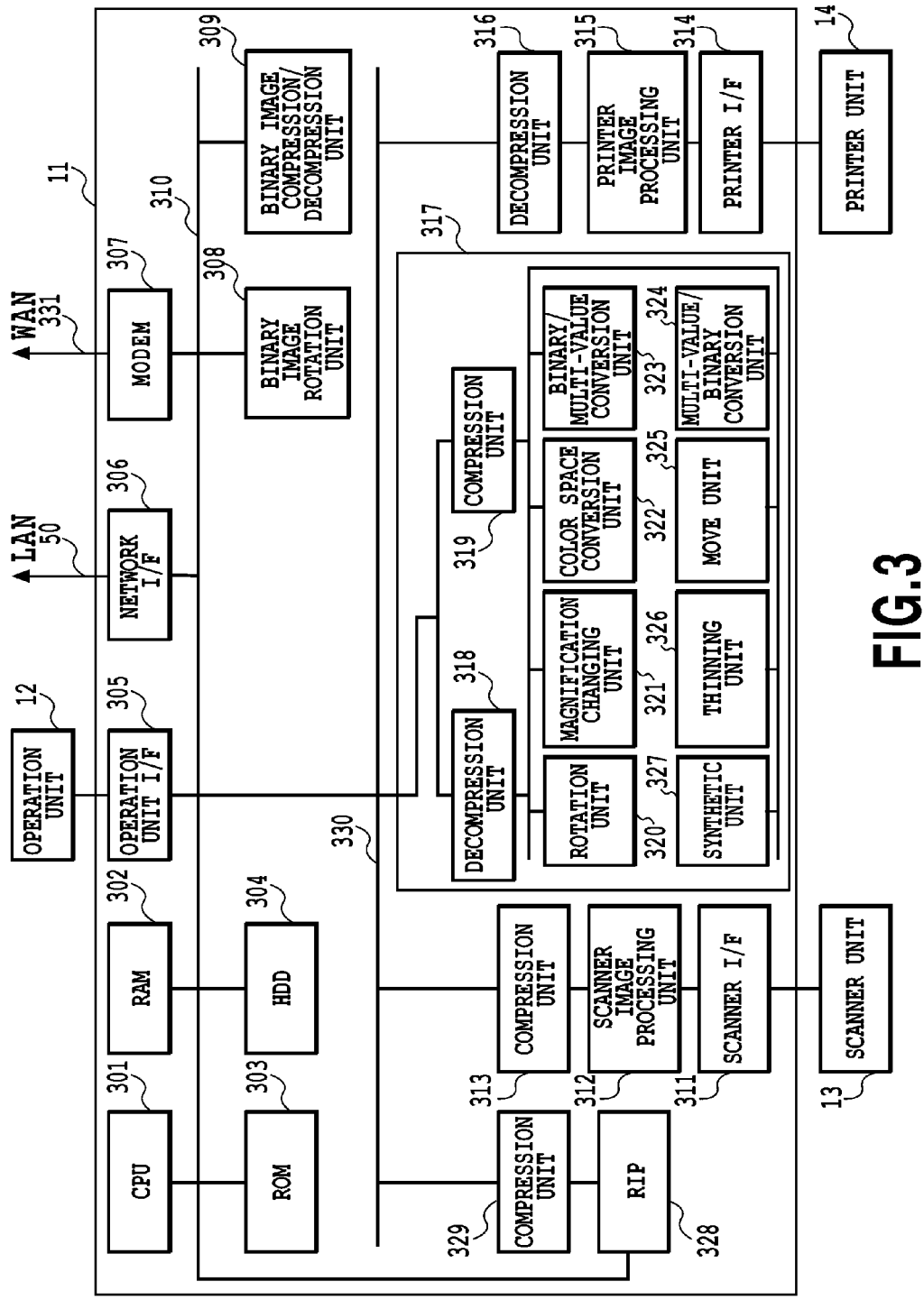
FIG. 3 is a diagram illustrating a controller of the image forming apparatus.

FIG. 3 is a block diagram for illustrating details of the controller 11 in the image forming apparatus 10.

The controller 11 is electrically connected to the scanner unit 13 and the printer unit 14. The controller 11 may be connected to a PC 40, an external apparatus, or the like via a LAN 50 and a WAN 331 as shown hereinafter in FIG. 37. Thereby, the controller 11 can input and output image data and device information.

In FIG. 3, the CPU 301 controls collectively accesses to the various devices that are currently connected thereto, using a control program and the like stored in a ROM 303, and also controls collectively various kinds of processing that are performed inside the controller. A RAM 302 is a system work memory for operation of the CPU 301 and also a memory for storing image data temporarily. This RAM 302 includes an SRAM, stored contents of which are retained after the power is switched off, and a DRAM, stored contents of which are erased after the power is switched off. The ROM 303 stores a boot program and the like for the image forming apparatus. An HDD 304, which is a hard disk drive, is used to store system software and image data.

An operation unit I/F 305 is an interface unit for connecting a system bus 310 to the operation unit 12. This operation unit I/F 305 receives image data to be displayed on the operation unit 12 from the system bus 310 and outputs the image data to the operation unit 12, and also outputs information received from the operation unit 12 to the system bus 310.

A network I/F 306 is connected to the LAN 50 and the system bus 310 for information input and output. A modem 307 is connected to the WAN 331 and the system bus 310 for information input and output. A binary image rotation unit 308 converts a direction of image data to be transmitted. A binary image compression/decompression unit 309 converts a resolution of image data to be transmitted into a predetermined resolution or a resolution that is compatible with capability of a counterpart apparatus. Here, for data compression or decompression, a method such as JBIG, MMR, MR, or MH is employed. An image bus 330, which is a transmission line for exchanging image data, may be a PCI bus or an IEEE 1394 bus.

A scanner image processing unit 312 performs correction, modification, or edition on image data received from the scanner unit 13 via a scanner I/F 311. Here, the scanner image processing unit 312 determines whether the received image data is for a color document or a black and white document, or for a character document or a photograph document, and attaches the determination result to the image data. Such attached information is called attribute data. The detail of the processing performed by the scanner image processing unit 312 will be described hereinafter.

Figure 4:
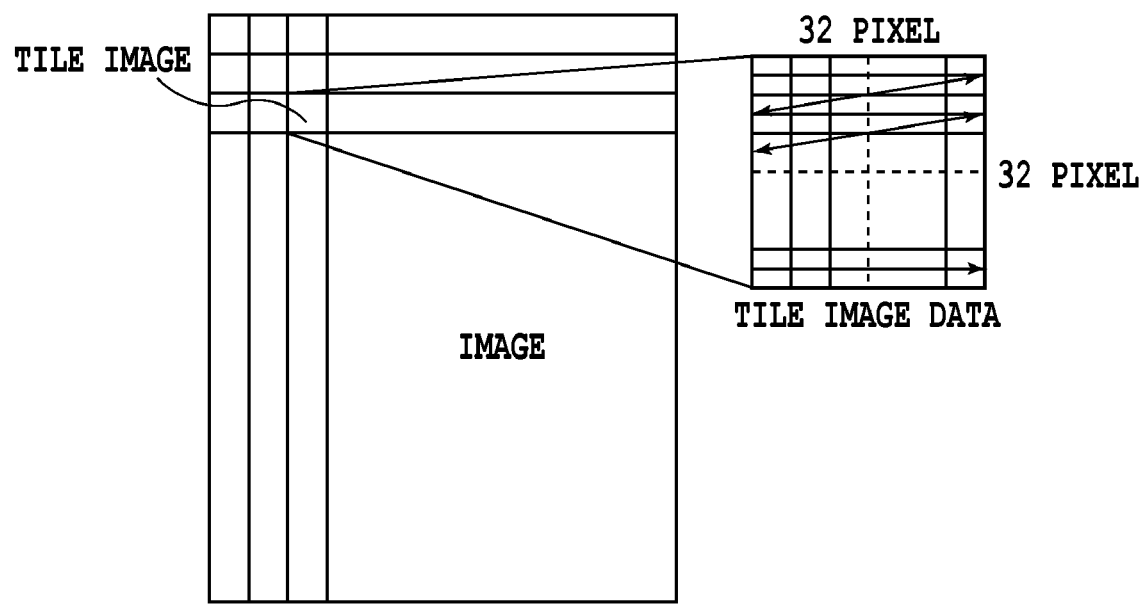
FIG. 4 is a conceptual diagram showing tile data.

A compression unit 313 receives image data and divides this image data into blocks of 32 pixels×32 pixels each. Here, the 32×32 pixel image data is called tile data. FIG. 4 is a conceptual diagram showing this tile data. In a document (a sheet medium before scanning), an area corresponding to this tile data is called a tile image. To the tile data, average luminance information for the block of 32×32 pixels and position coordinate information of the tile image on a document are attached as header information. Further, the compression unit 313 shown in FIG. 3 compresses the image data consisting of multiple blocks of the tile data. A decompression unit 316, after decompression of the image data consisting of multiple blocks of the tile data, performs raster development on the image data and then transmits the resultant image data to a printer image processing unit 315.

The printer image processing unit 315 shown in FIG. 3 receives the image data from the decompression unit 316, and performs image processing on the image data with reference to attribute data attached to the image data. The image data after the image processing is then output to the printer unit 14 via a printer I/F 314. The details of the processing performed by this printer image processing unit 315 will be described hereinafter.

An image conversion unit 317 performs a predetermined conversion processing on image data. The image conversion unit 317 includes the following processing units.

A decompression unit 318 decompresses received image data. A compression unit 319 compresses received image data. A rotation unit 320 rotates received image data. A magnification changing unit 321 performs a resolution conversion processing (e.g., from 600 dpi to 200 dpi) on received image data. A color space conversion unit 322 converts a color space of received image data. With use of a matrix or a table, the color space conversion unit 322 can perform a publicly-known background removal processing, a publicly-known LOG conversion processing (RGB to CMY), and a publicly-known output color correction processing (CMY to CMYK) A binary/multi-value conversion unit 323 converts received binary tone image data into 256 tone image data, while a multi-value/binary conversion unit 324 converts received 256 tone image data into binary tone image data using a method such as an error diffusion processing.

A synthetic unit 327 synthesizes two pieces of received image data to generate one piece of image data. For synthesizing two pieces of image data, there is a method in which an average value of luminance levels of both pixels to be synthesized is assumed to be a synthesized luminance value, or a method in which a greater luminance value for the pixels to be synthesized is assumed to be a luminance level of a synthesized pixel. Also, regarding the latter method, it is possible to use a method in which a smaller luminance value for the pixels to be synthesized is assumed to be a luminance level after synthesis. Moreover, the synthesis of image data can employ methods to determine a luminance level after synthesis through a logical sum operation, a logical product operation or an exclusive OR operation of luminance values in pixels to be synthesized. These are all well known synthesizing methods. A thinning unit 326 performs a resolution conversion by thinning out pixels of received image data to generate image data, a resolution of which is ½, ¼, ⅛, or the like of the received image data. A move unit 325 adds a margin portion to received image data, or deletes a margin portion from received image data.

An RIP 328 receives intermediate data generated on the basis of PDL code data transmitted from the PC 40 or the like, and generates (multi-valued) bit map data.

<Detailed Description of the Scanner Image Processing Unit 312>

Figure 5:
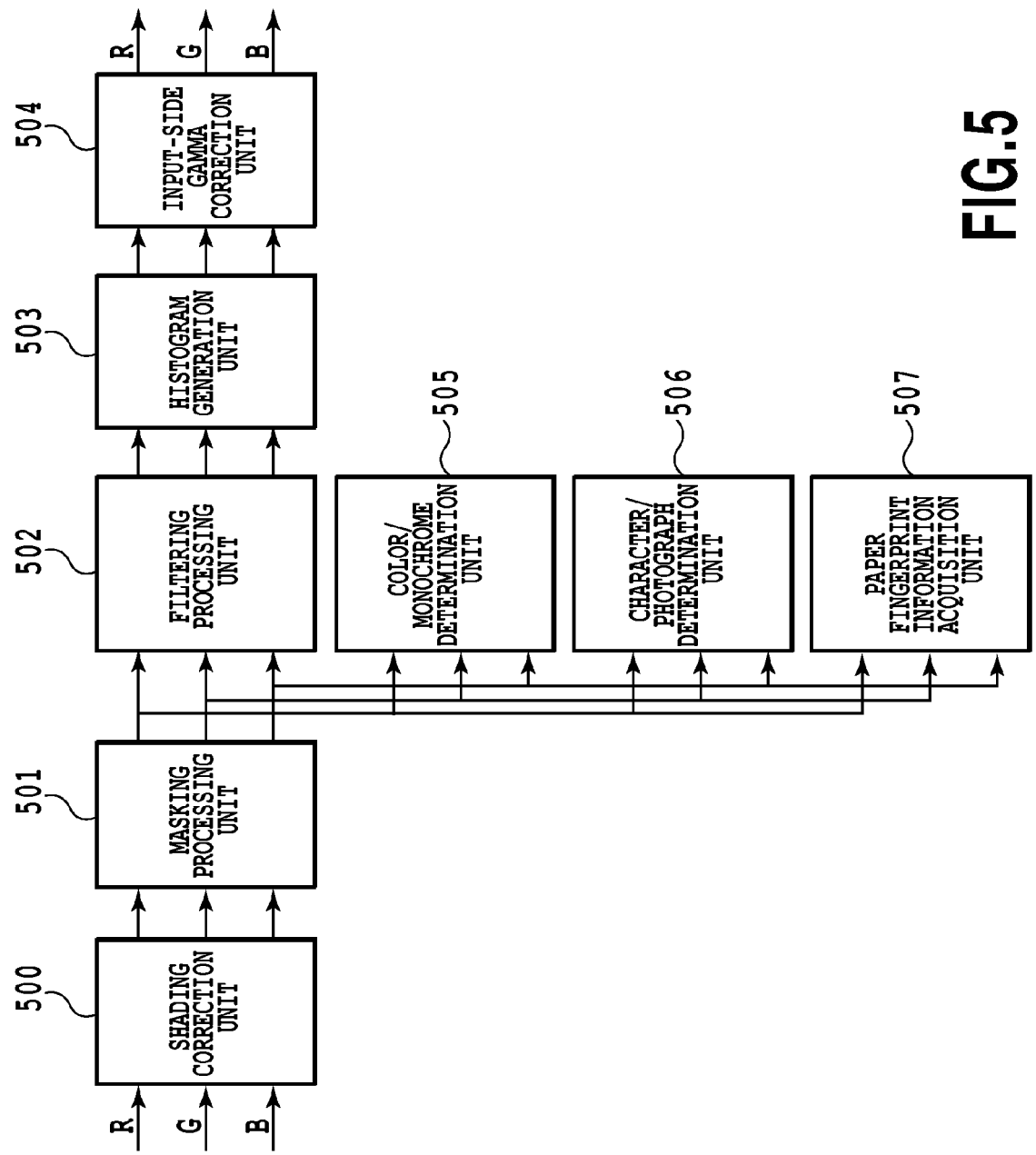
FIG. 5 is a block diagram of a scanner image processing unit.

FIG. 5 is a block diagram showing an internal configuration of the scanner image processing unit 312.

The scanner image processing unit 312 receives image data consisting of RGB luminance signals of 8 bits each.

The shading correction unit 500 shown in FIG. 5 performs a shading correction on these luminance signals. The shading correction is processing for preventing a brightness of a document from being misrecognized due to the variation in sensitivities of the CCDs, as described above. Also, as described above, this shading correction unit 500 can perform the gain adjustment by an instruction from the CPU 301 shown in FIG. 3.

A masking processing unit 501 converts received luminance signals into standard that do not depend on a filter color of the CCDs.

A filtering processing unit 502 corrects a spatial frequency of received image data in an arbitrary manner. This filtering processing unit performs a computation processing on the received image data using a matrix of 7×7, for example.

Figure 19:
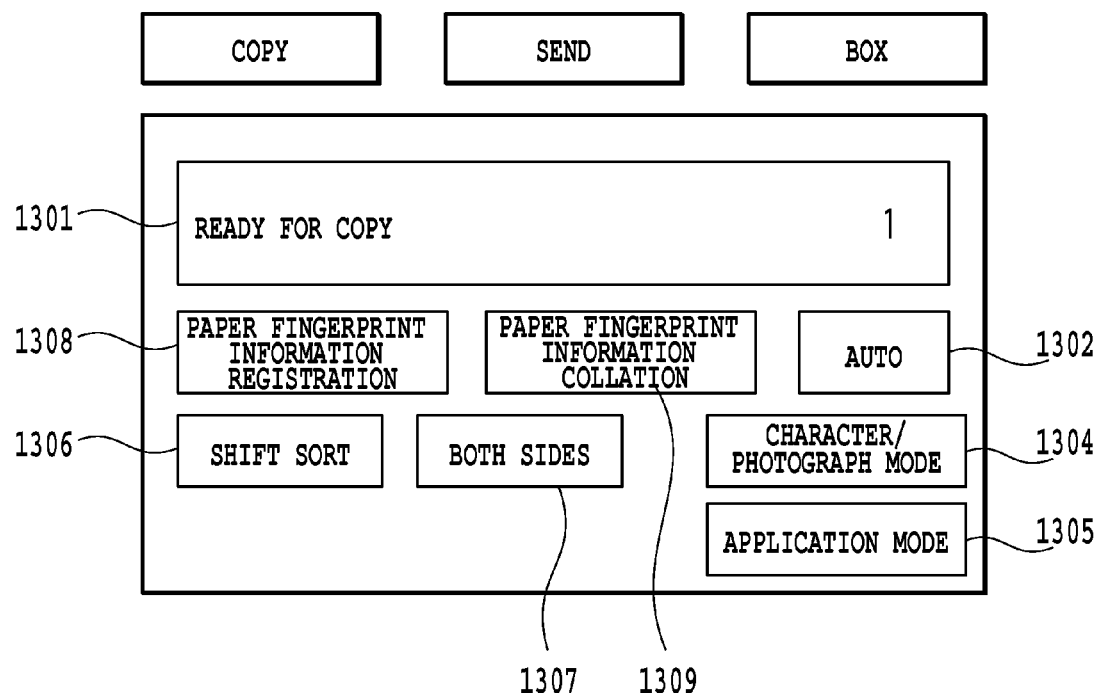
FIG. 19 is an explanatory diagram of an operation unit.
Figure 20:
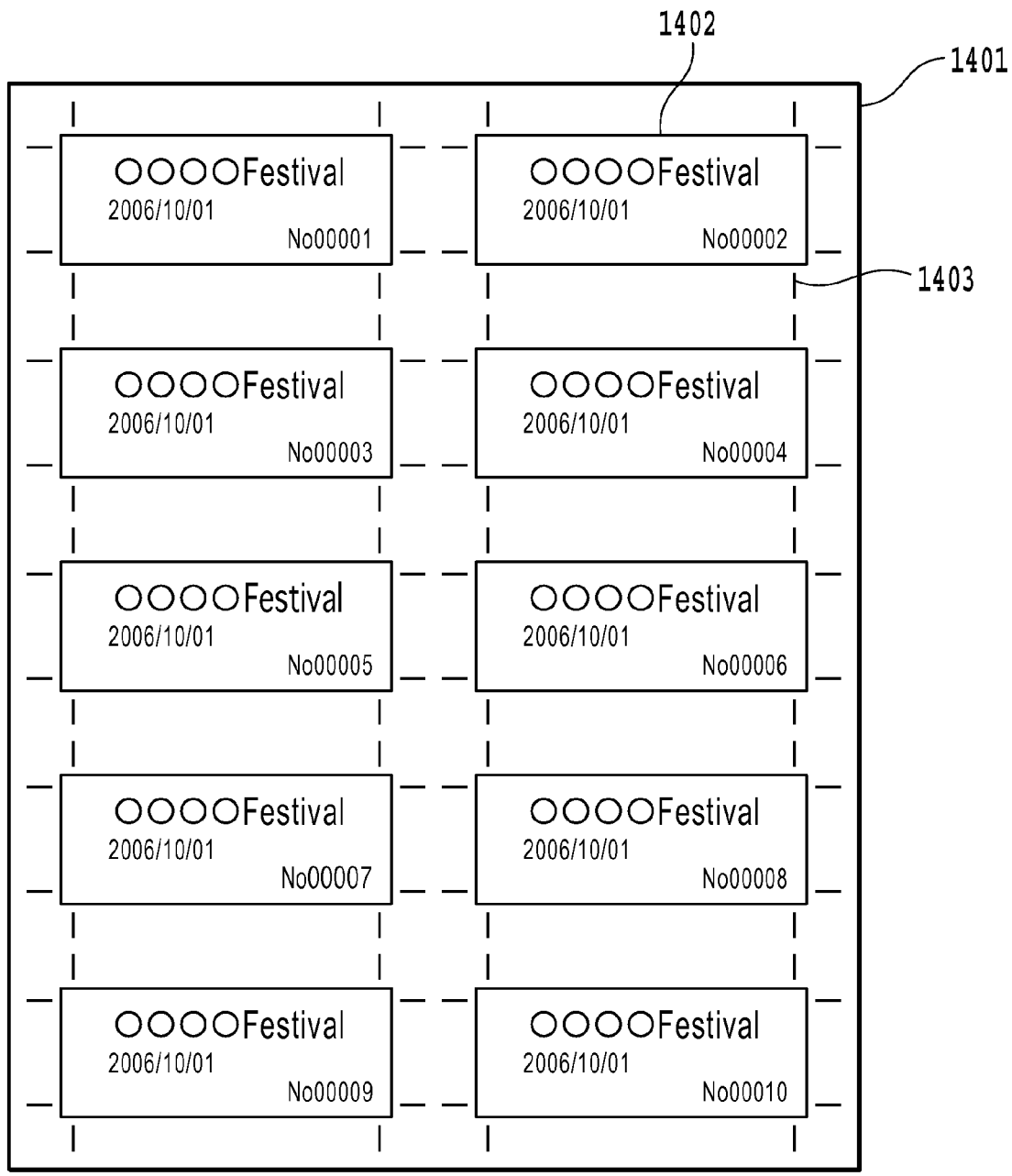
FIG. 20 is a diagram showing an example of imposing multiple pieces of document data on a sheet.
Figure 21:
FIG. 21 is a diagram showing an example of one piece of the document data of FIG. 20.
Figure 22:
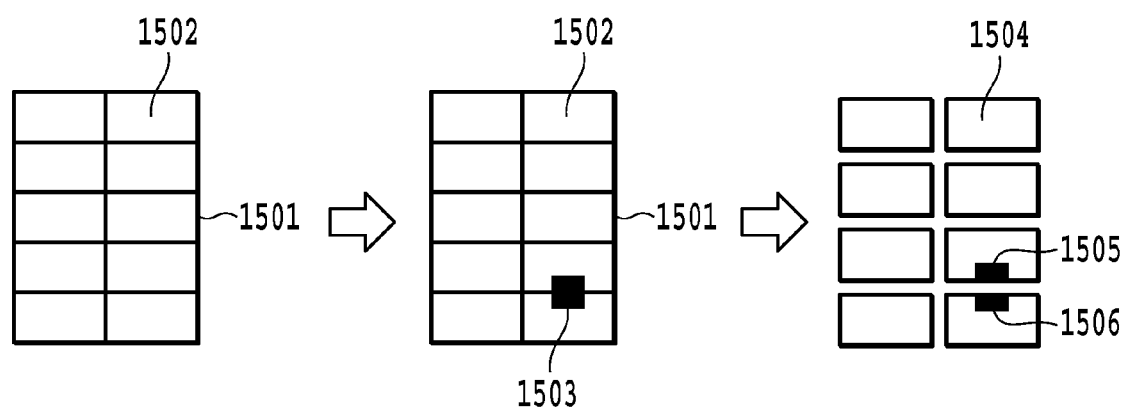
FIG. 22 is a diagram showing an example of a problem to be solved by the present invention.
Figure 23:
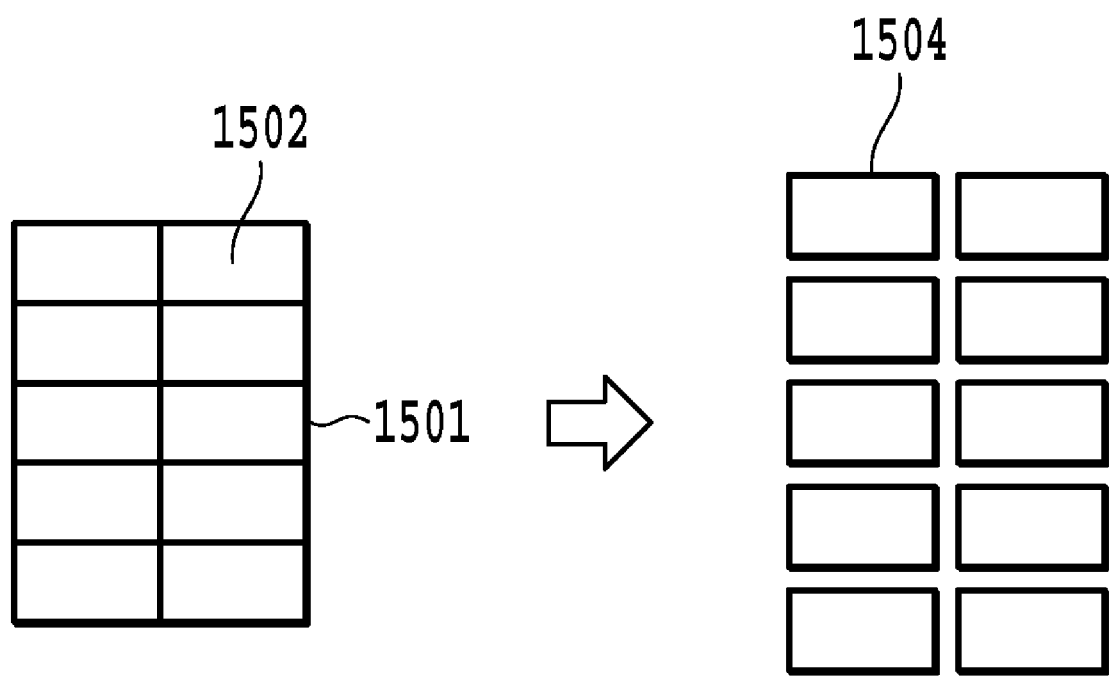
FIG. 23 is a diagram showing an example of another problem to be solved by the present invention.

Meanwhile, in a copying machine or a multi-functional apparatus, a user can select a character mode, a photograph mode, or a character/photograph mode as a copy mode by pressing a tab 1304 shown in FIG. 19. Here, when the character mode is selected by the user, the filtering processing unit 502 shown in FIG. 5 applies character filtering to the entire image data. Also, when the photograph mode is selected, the filtering processing unit 502 applies photograph filtering to the entire image data. Further, when the character/photograph mode is selected, the filtering processing unit 502 switches filters between the photograph filter and the character filter adaptively for each pixel according to a character/photograph determination signal described below (a part of the attribute data). Note that, the photograph filter has a coefficient such as smoothing only a high frequency component. This is for preventing roughness of an image from being outstanding. Also, the character filter has a coefficient such as performing a strong edge enhancement. This is for expressing sharpness of a character.

A histogram generation unit 503 samples luminance data of individual pixels constituting received image data. More specifically, the histogram generation unit 503 samples, at constant pitches in the main scanning direction and the sub-scanning direction, the luminance data included in a rectangular area that is defined by a starting point and an ending point designated in each of the main scanning direction and the sub-scanning direction. Then, the histogram generation unit 503 generates histogram data based on the sampling results. The generated histogram data is used for estimating a ground level in the ground elimination processing. An input-side gamma correction unit 504 converts image data into a luminance data having nonlinear characteristics by using a table or the like.

A color/monochrome determination unit 505 determines whether each pixel in received image data represents chromatic color or achromatic color, and attaches the determination result, as the color/monochrome determination signal (a part of the attribute data), to the image data.

A character/photograph determination unit 506 determines whether each pixel in image data is a pixel of a character, or of a halftone dot, or of a character in halftone dots, or of a solid image, on the basis of a pixel value of each pixel and pixel values of surrounding pixels of each pixel. Note that a pixel that does not fit into any of these categories is a pixel of a white area. Then, the character/photograph determination unit 506 attaches the determination results, as the character/photograph determination signal (a part of the attribute data), to the image data.

A paper fingerprint information acquisition unit 507 determines an appropriate region for the paper fingerprint information acquisition region in the RGB image data input from the shading correction unit 500 and acquires image data of the determined paper fingerprint information acquisition region. The paper fingerprint information acquisition processing will be described hereinafter with reference to FIG. 7.

<Detailed Description of the Printer Image Processing Unit 315>

Figure 6:
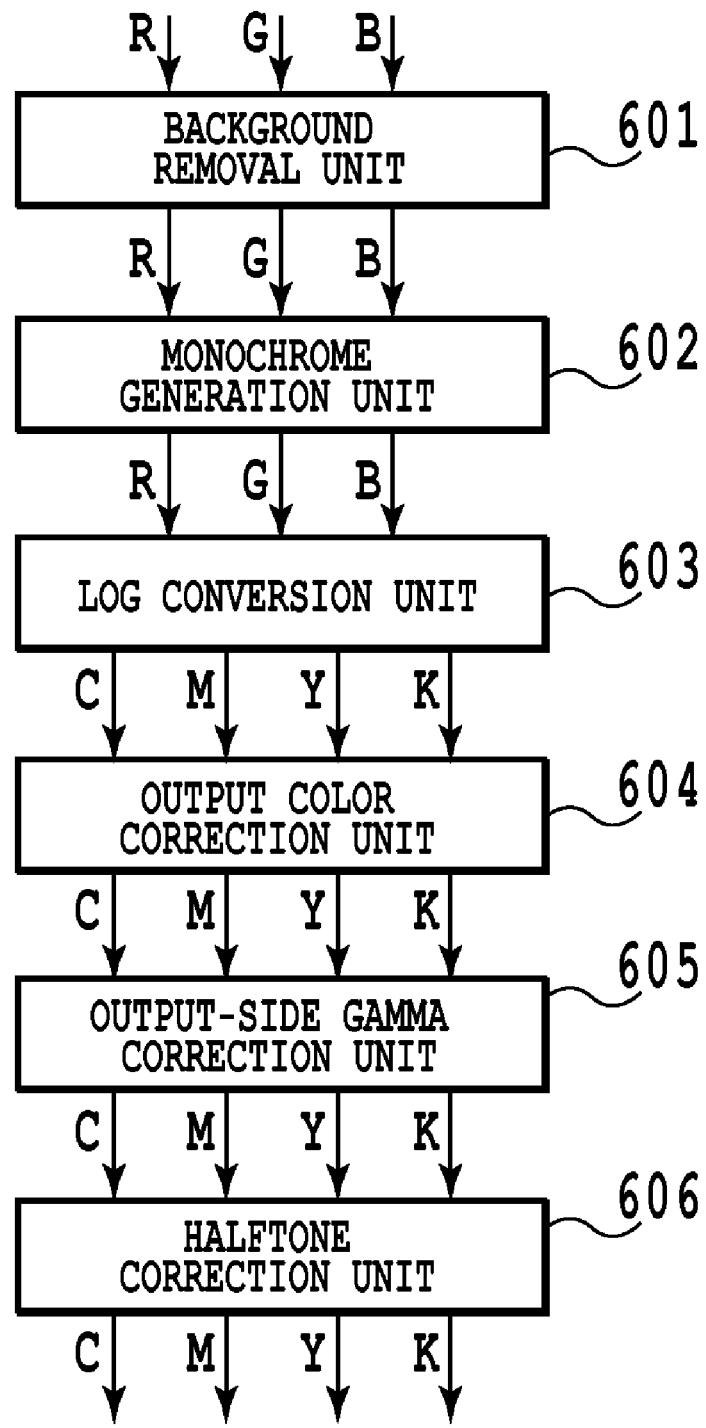
FIG. 6 is a block diagram of a printer image processing unit.

FIG. 6 shows a flow of processing performed in the printer image processing unit 315 shown in FIG. 3.

A ground elimination unit 601 shown in FIG. 6 eliminates (removes) ground of image data using the histogram generated in the scanner image processing unit 312 shown in FIG. 3. A monochrome generation unit 602 shown in FIG. 6 converts color data into monochrome data. A Log conversion unit 603 performs luminance-density conversion, for example, to convert input RGB image data into CMY image data. An output-color correction unit 604 performs output color correction. The output-color correction unit 604 converts input CMY image data into CMYK image data by using a table or a matrix, for example. An output-side gamma correction unit 605 performs a correction such that a signal value input to this output-side gamma correction unit 605 is proportional to a reflection density value of a copied output. A halftone correction unit 606 performs a half tone processing according to the number of tones in an output printer unit. The halftone correction unit 606 performs binarization or quantization to 32-values, for example, on received image data with high gradation values.

Note that each processing unit provided in the scanner image processing unit 312 or the printer image processing unit 315 shown in FIG. 5 can also output received image data without performing any processing thereon. Such an event that a certain processing unit passes data without performing any processing thereon will be described as "pass through the processing unit" hereinafter.

<Paper Fingerprint Acquisition Processing>

Figure 7:
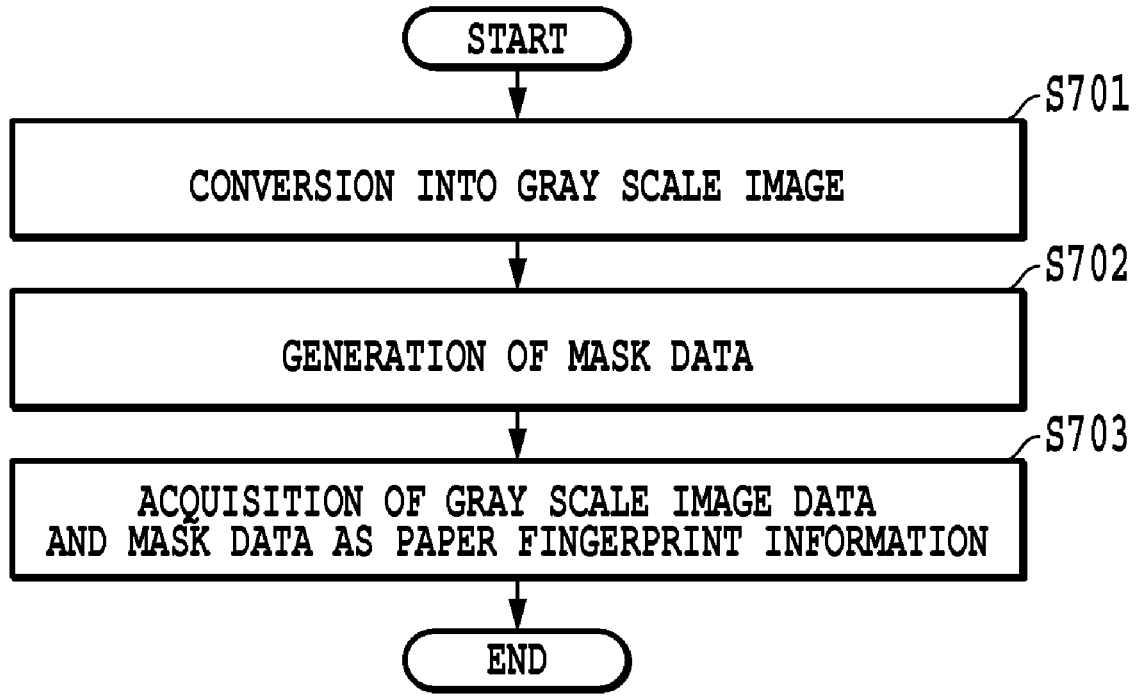
FIG. 7 is a flowchart of paper fingerprint information acquisition processing.

FIG. 7 is a flowchart showing the paper fingerprint information acquisition processing performed by the paper fingerprint information acquisition unit 507 shown in FIG. 5.

A step S701 of the flowchart shown in FIG. 7 performs processing to convert the image data acquired in the paper fingerprint information acquisition unit 507 into image data having gray scales. Next, a step S702 performs processing to generate a mask data for collation by removing image data which could be a factor causing misrecognition such as printed or hand-written character data from the converted image data with gray scales obtained in the step S701. The mask data is binary data of "0" or "1". The mask data value is set to "1" for a pixel having a luminance signal value equal to or larger than a first threshold value (i.e., lighter) in the image data with gray scales. Also, for a pixel having a luminance signal value smaller than the first threshold value, the mask data value is set to "0". The above processing is performed for each pixel included in the image data with gray scales. Subsequently, a step S703 performs processing to acquire two pieces of data, the converted image data with gray scales obtained in the step S701 and the mask data generated in the step S702, as paper fingerprint information. Note that the above two pieces of data is called the paper fingerprint information in the embodiments according to the present invention, while the converted image data with gray scales obtained in the step S701 itself is sometimes called the paper fingerprint information.

The paper fingerprint information acquisition unit 507 sends the paper fingerprint information of the above paper fingerprint information acquisition region to the RAM 302 via a data bus (not shown in the drawings).

<Paper Fingerprint Information Registration Processing>

The CPU 301 shown in FIG. 3 reads the paper fingerprint information of a predetermined area sent from the paper fingerprint information acquisition unit 507 to the RAM 302 and registers the read paper fingerprint information in the sever 20 shown in FIG. 1. This registration is performed by execution of a program stored in the RAM 302.

<Paper Fingerprint Information Collation Processing>

The CPU 301 shown in FIG. 3 can control reading the paper fingerprint information sent from the paper fingerprint information acquisition unit 507 to the RAM 302, and collating the read paper fingerprint information with other paper fingerprint information. Here, the other paper fingerprint information means paper fingerprint information registered in the server in the embodiment 1.

Figure 8:
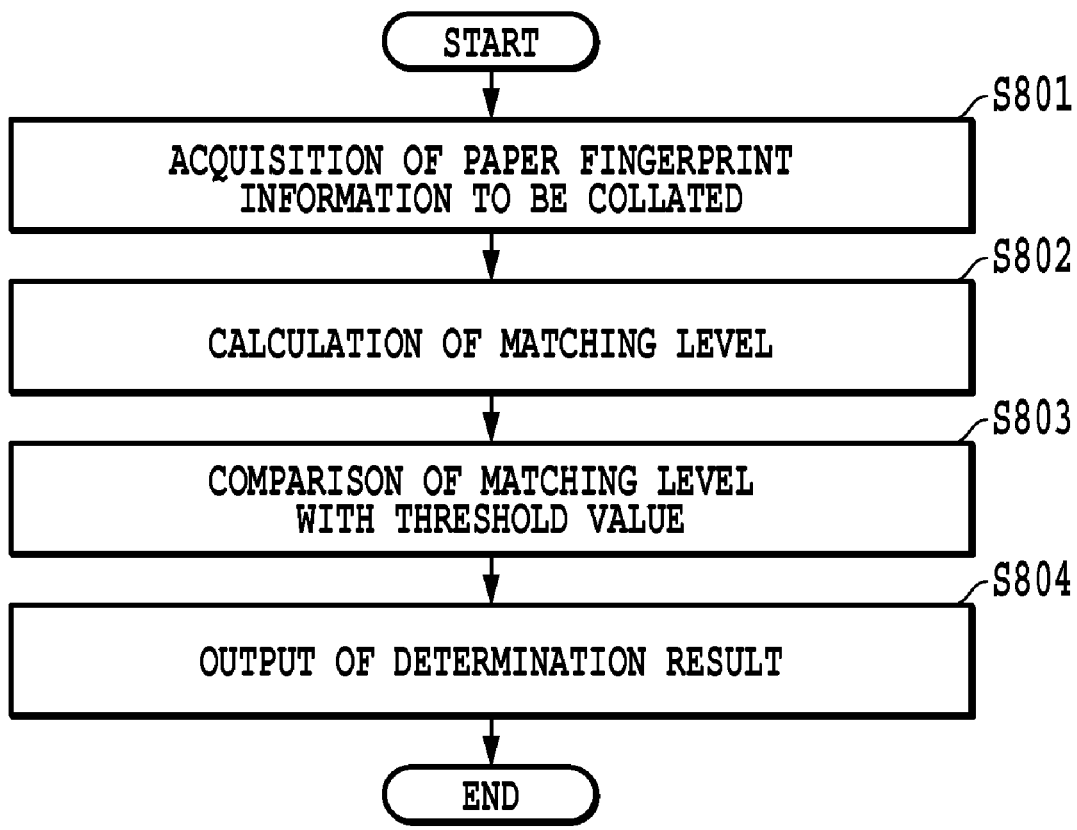
FIG. 8 is a flowchart of paper fingerprint information collation processing.

FIG. 8 is a flow chart showing this paper fingerprint information collation processing. Processing in each step of this flowchart is performed under a collective control of the CPU 301 shown in FIG. 3.

A step S801 performs processing to acquire the paper fingerprint information from the RAM 302.

Next, a step S802 performs processing to collate the (registered) paper fingerprint information sent from the paper fingerprint information acquisition unit 507 and the paper fingerprint information to be collated taken out (just taken out) in the step S801. In the collation, position shift correction is performed first from a consideration that the registered paper fingerprint information and the taken-out paper fingerprint information might be acquired from positions different from each other. The position shift correction processing will be described below. Subsequently, a step S803 compares a value how similar the two pieces of paper fingerprint information obtained in the step S802 (hereinafter, referred to as a matching level) with a predetermined threshold and performs processing to judge "valid" or "invalid". Note that the matching level is also referred to as a similarity level. Also, the comparison result of the matching level and the predetermined threshold is sometimes referred to as a collation result. Lastly, a step S804 outputs a judgment result by the step 803.

<Position Shift Correction>

First, error values of the two pieces of paper fingerprint information E (i, j) (for a shift of the two pieces of paper fingerprint information by (i, j)) are obtained by a formula 1 shown below in the number of (2n−1)×(2m−1).

Formula 1

$$E(i, j) = \frac{\sum_{x,y} \alpha_1(x, y)\alpha_2(x - i, y - j)\{f_1(x, y) - f_2(x, y)\}^2}{\sum_{x,y} \alpha_1(x, y)\alpha_2(x - i, y - j)} \quad (1)$$

In the formula 1, $\alpha_1$ is the mask data in the (registered) paper fingerprint information taken-out in the step S801. $f_1$ is the image data with gray scales in the (registered) paper fingerprint information taken-out in the step S801. $\alpha_2$ is the mask data in the paper fingerprint information to be collated sent from the paper fingerprint information acquisition unit 507 in the step S802. $f_2$ is the image data with gray scales in the paper fingerprint information to be collated sent from the paper fingerprint information acquisition unit 507 in the step S802.

Figure 9:
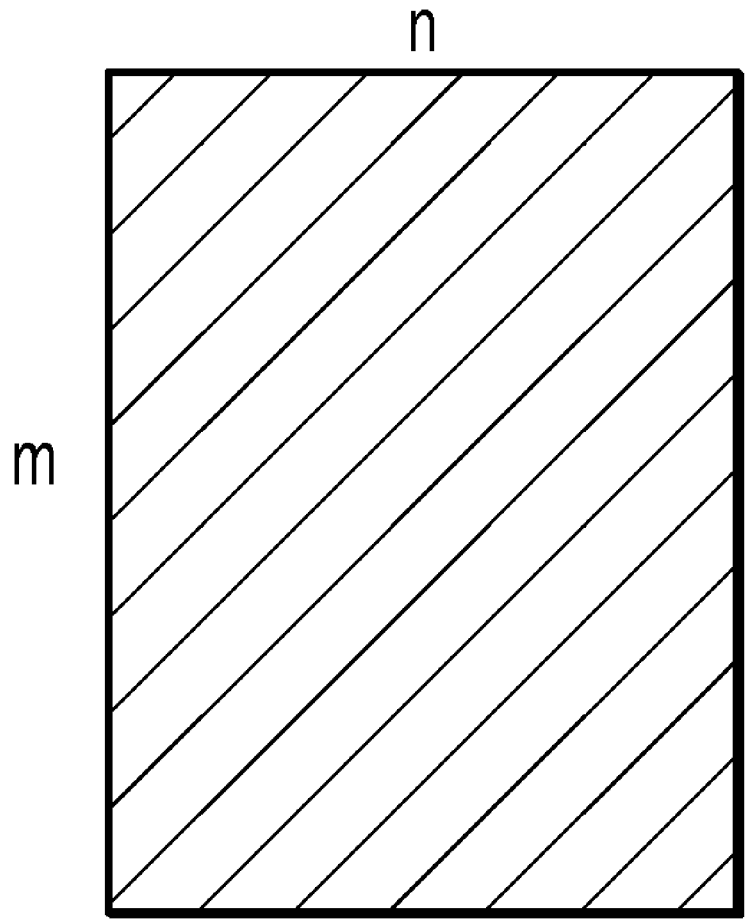
FIG. 9 is a diagram showing registered paper specific information.
Figure 10:
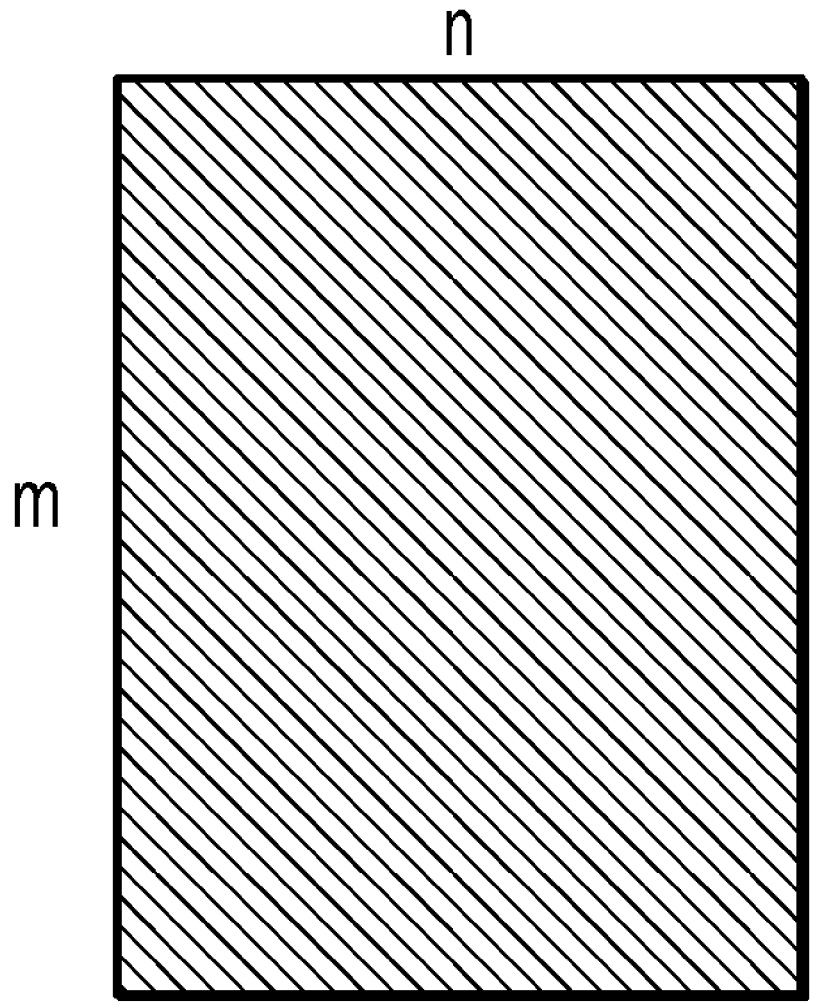
FIG. 10 is a diagram showing paper specific information to be collated.

A specific method for the position shift correction will be described below with reference to FIGS. 9 to 18. FIG. 9 shows the registered paper fingerprint information, and FIG. 10 shows an image diagram of the paper fingerprint information to be collated. Each of two pieces of the information has n pixels in the horizontal direction and m pixels in the vertical direction.

In the function shown in the formula 1, the error values E (i, j) of the registered paper fingerprint information and the paper fingerprint information to be collated are obtained in the number of (2n−1)×(2m−1) by shifting i and j by one pixel in a range of −n+1 to n−1 and −m+1 to m−1, respectively. That is, E (−n+1, −m+1) to E (n−1, m−1) are obtained.

Figure 11:
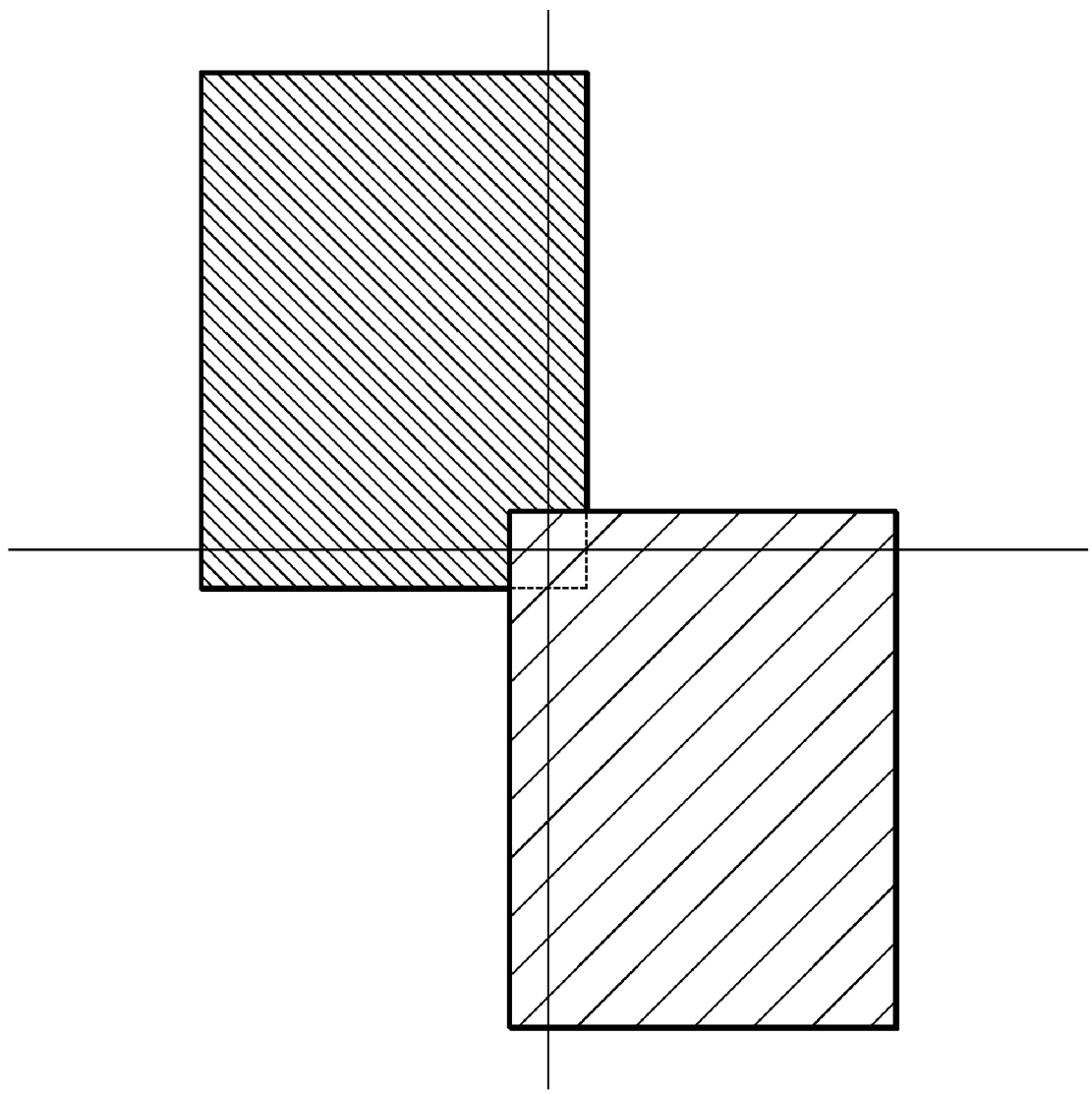
FIG. 11 is a diagram showing a method for obtaining $E_{1\times1}$.

FIG. 11 represents an image diagram in which an upper left pixel of the registered paper fingerprint information is overlapped just by a lower right pixel of the paper fingerprint information to be collated. In this situation, a value obtained from the function of the formula 1 is E (−n+1, −m+1).

Figure 12:
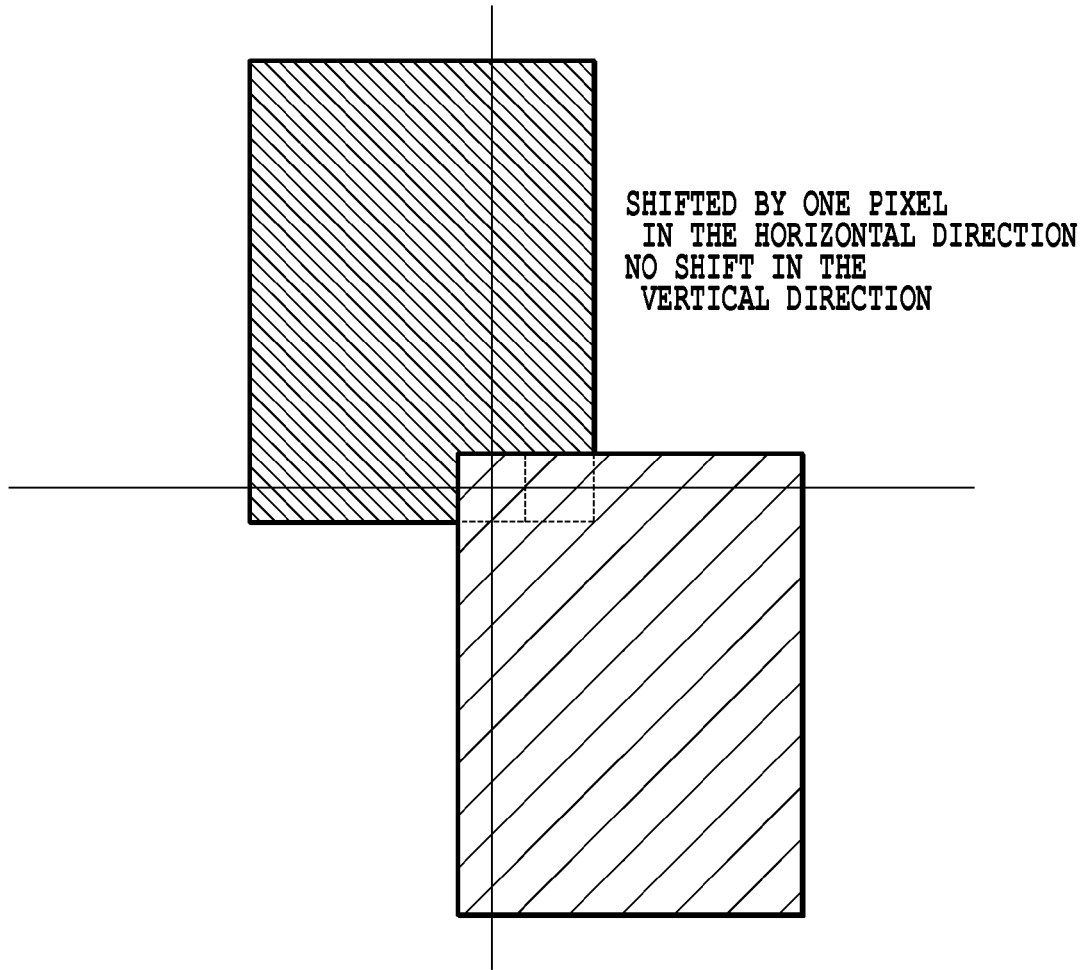
FIG. 12 is a diagram showing a method for obtaining $E_{2\times1}$.

FIG. 12 represents an image diagram when the paper fingerprint information to be collated is shifted rightward from the situation of FIG. 11 by one pixel. In this situation, a value obtained from the function of the formula 1 is E (−n+2, −m+1). Operations are performed in the same manner by moving the paper fingerprint information to be collated.

Figure 13:
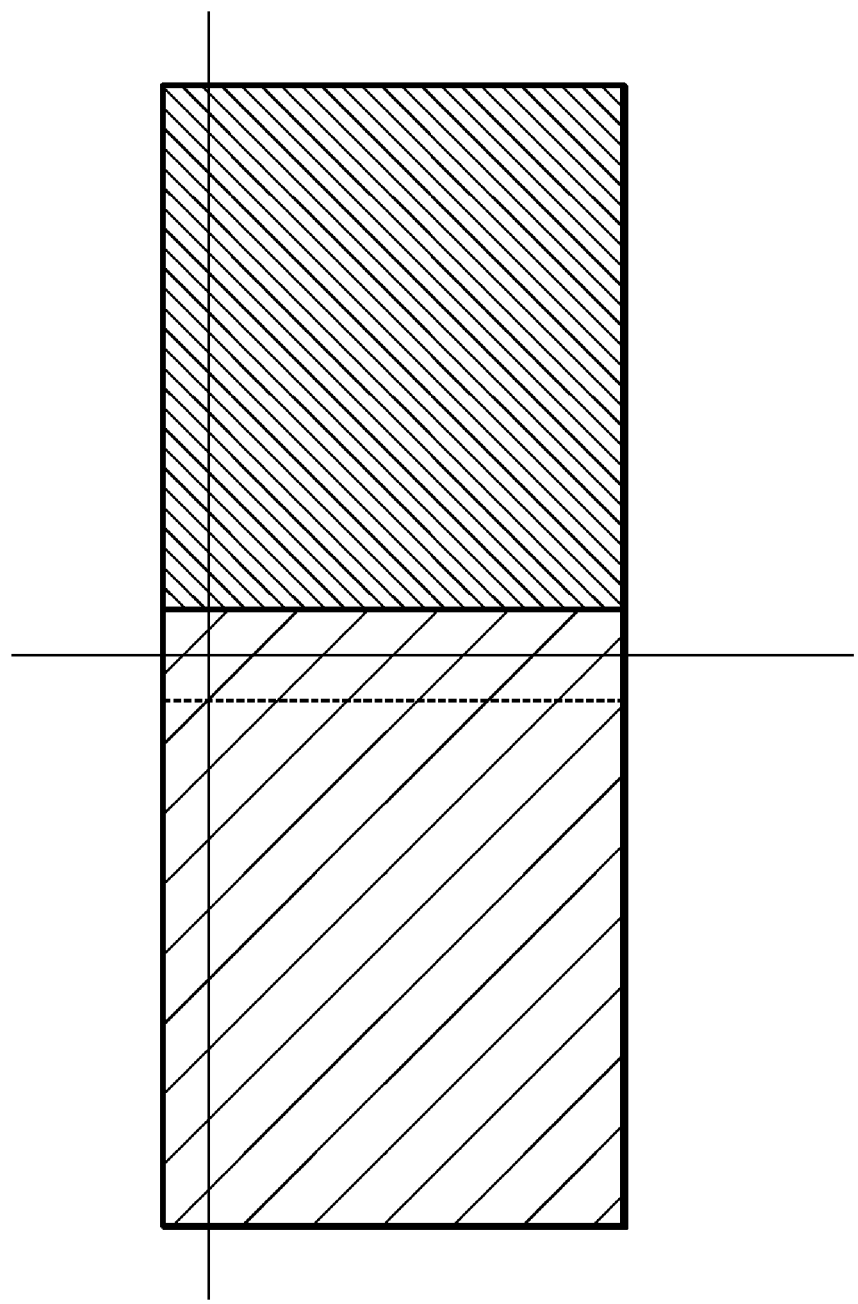
FIG. 13 is a diagram showing a method for obtaining $E_{n\times1}$.
Figure 14:
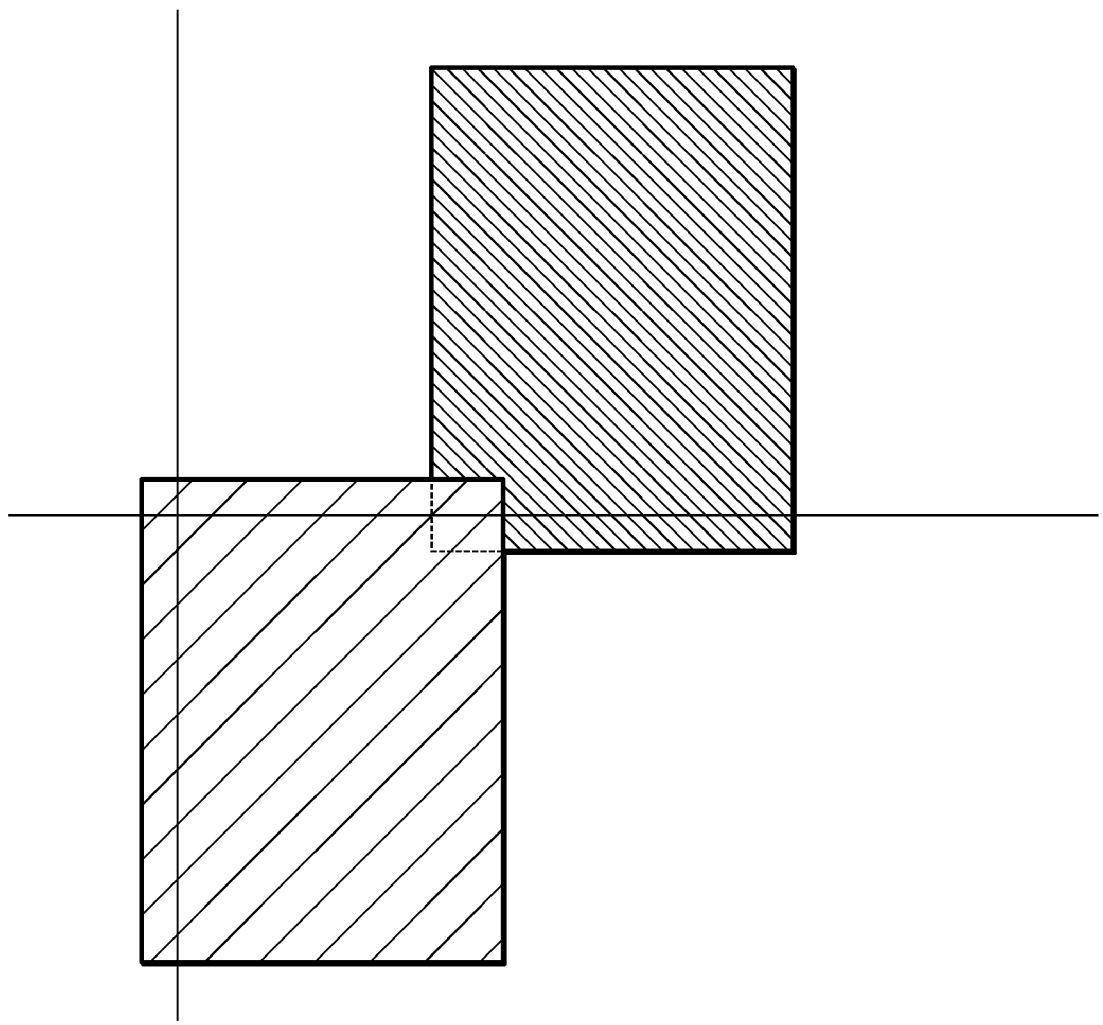
FIG. 14 is a diagram showing a method for obtaining $E_{2n-1\times1}$.

In FIG. 13, the paper fingerprint information to be collated is moved to a position to overlap the registered paper fingerprint information, and E (0, −(−m−1)) is obtained from this situation. Further, in FIG. 14, the paper fingerprint information to be collated is moved to the right end, and E (n −1, −m+1) is obtained. In this manner, i in E (i, j) is incremented by one, each time the paper fingerprint information to be collated is shifted in the horizontal direction.

Figure 15:
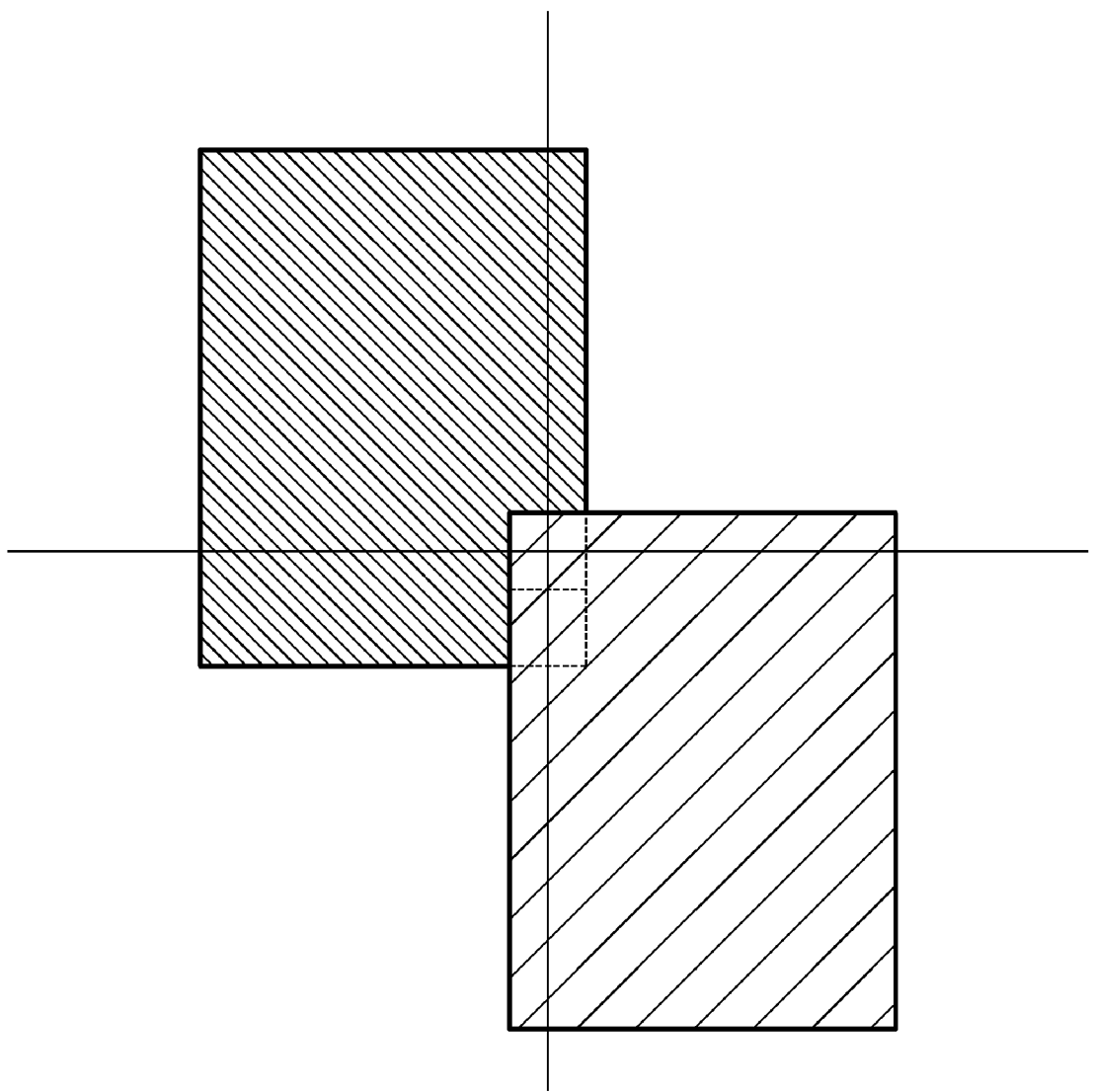
FIG. 15 is a diagram showing a method for obtaining $E_{1\times2}$.

Similarly, in FIG. 15, the paper fingerprint information to be collated is shifted downward in the vertical direction from the situation of FIG. 11 by one pixel and a value of E (−n+1, −m+2) is obtained.

Figure 16:
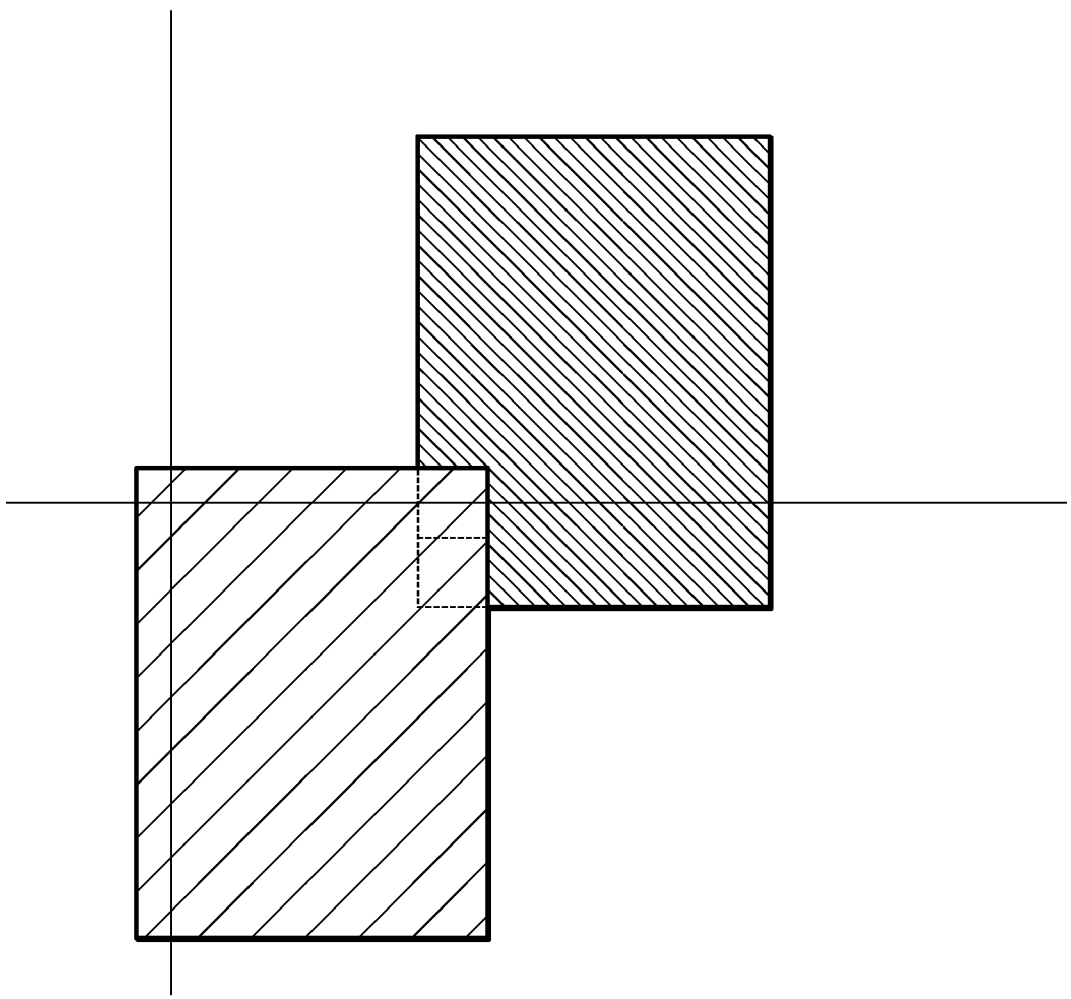
FIG. 16 is a diagram showing a method for obtaining $E_{2n-1\times2}$.

Further, in FIG. 16, the paper fingerprint information obtained this time is moved to the right end from the situation of FIG. 15 and E (n−1, −m+2) is obtained.

Figure 17:
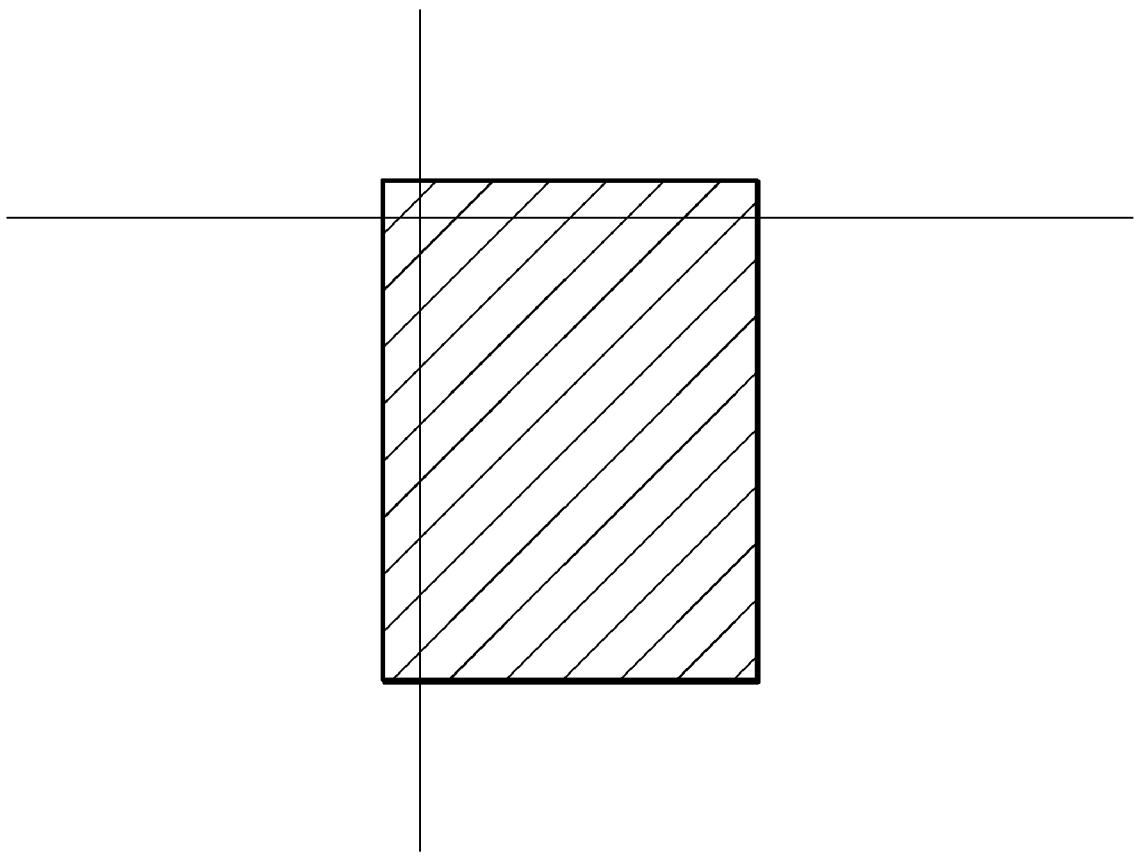
FIG. 17 is a diagram showing a method for obtaining $E_{n\times m}$.

FIG. 17 represents a situation in which the registered paper fingerprint information and the paper fingerprint information to be collated are at the same position, and E (i, j) of this situation is set to be E (0, 0).

Figure 18:
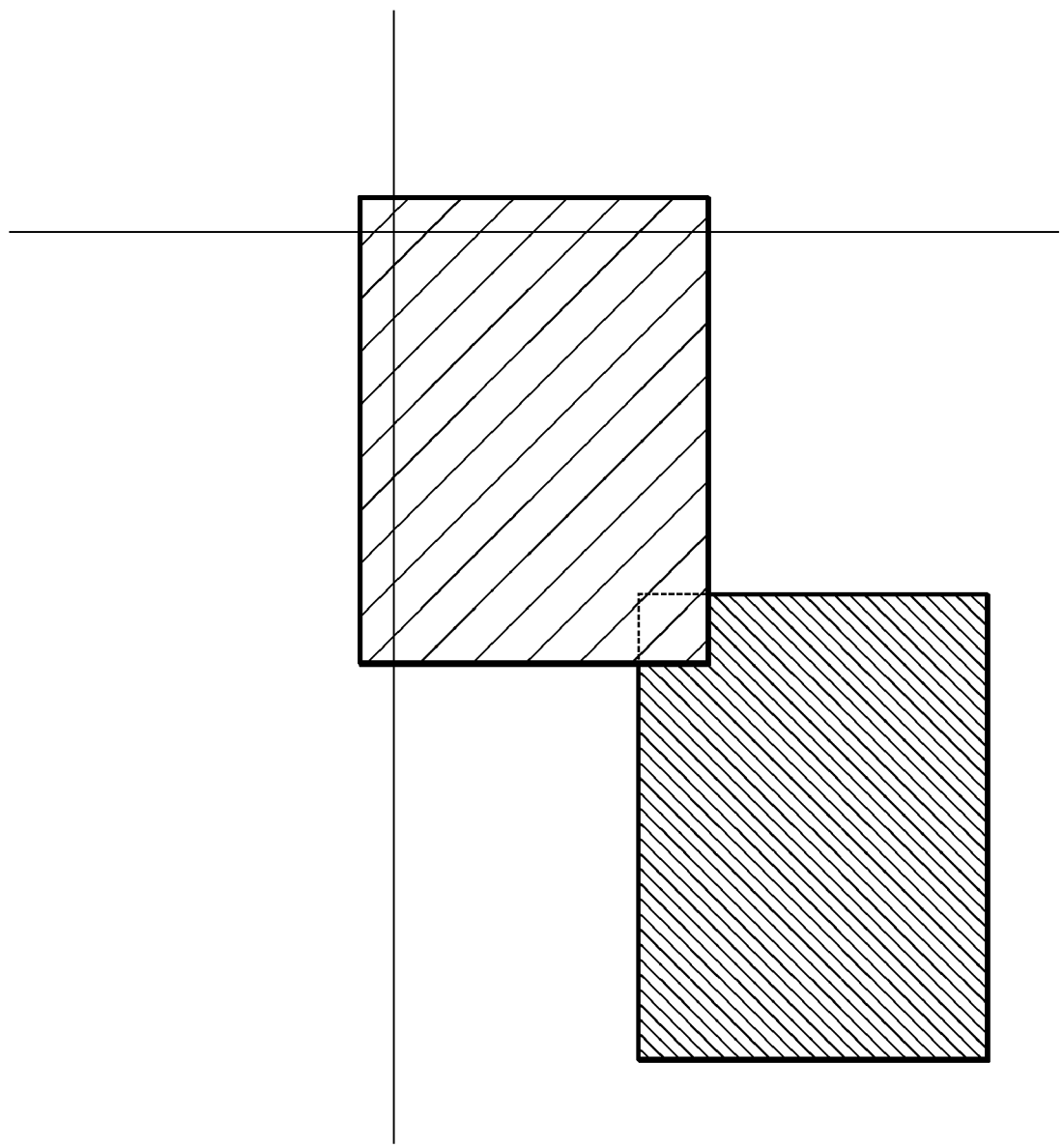
FIG. 18 is a diagram showing a method for obtaining $E_{2n-1\times2m-1}$.

Similarly, operations are performed by the CPU 301 shown in FIG. 3 by shifting the image such that the two pieces of paper fingerprint information overlap each other in one or more pixels. Lastly, as shown in FIG. 18, E (n−1, m−1) is obtained by moving the paper fingerprint information to be collated.

In this manner, a set of (2n−1)×(2m−1) error values E (i, j) is obtained.

Here, for understanding a meaning of this formula 1, there is considered a case in which i=0, and j=0, $\alpha_1$(x, y)=1 (here, x=0 to n and y=0 to m), and $\alpha_2$(x−i, y−j)=1 (here, x=0 to n, and y=0 to m). That is, E (0, 0) is obtained when $\alpha_1$(x, y)=1 (here, x=0 to n and y=0 to m), and $\alpha_2$ (X−i, y−j)=1 (here, x=0 to n, and y=0 to m).

Here, i=0 and j=0 means that the registered paper fingerprint information and the paper fingerprint information to be collated are at the same position as shown in FIG. 17.

Here, $\alpha_1$(x, y)=1 (here, x=0 to n and y=0 to m) means that all the pixels of the registered paper fingerprint information are light. In other words, it means that there was no color material such as toner and ink or dust on the paper fingerprint acquisition region when the registered paper fingerprint information was acquired.

Also, $\alpha_2$(X−i, y−j)=1 (here, x=0 to n, and y=0 to m) means that all the pixels of the paper fingerprint information to be collated are light. In other words, it means that there was no color material such as toner and ink or dust on the paper fingerprint acquisition region when the newly acquired paper fingerprint information was acquired.

In this manner, when all the pixels satisfy $\alpha_1$ (x, y)=1 and $\alpha_2$ (x−i, y−j)=1, Formula 2

$$E(0, 0) = \sum_{x=0, y=0}^{n,m} \{f_1(x, y) - f_2(x, y)\}^2 \quad (2)$$

is obtained from the formula 1.

In the formula 2, $\{f_1 (x, y) - f_2(x, y)\}^2$ represents a square value of a difference between the image data with gray scales in the registered paper fingerprint information and the image data with gray scales in the paper fingerprint information to be collated. Therefore, in such a case, the formula 2 represents a sum of a square difference value of the two pieces of the paper fingerprint information in each pixel. That is, E (0, 0) takes a smaller value in the formula 2 with an increase in the number of pixels where $f_1$ (x, y) and $f_2$ (x, y) are similar.

E (0, 0) is obtained as described above and other E (i, j) is obtained in the same manner. Here, E (i, j) takes a smaller value with an increase in the number of pixels where $f_1$ (x, y) and $f_2$ (x, y) are similar. Therefore, when E (k,l)=min {E (i, j)}, it is found that the position where the registered paper fingerprint information was acquired and the position where newly acquired paper fingerprint information was acquired are shifted from each other by k and l.

<Meaning of α>

The numerator of the right side of the formula 1 means a result of multiplication of $\{f_1 (x, y) - f_2(x-i, y-j)\}^2$ by $\alpha_1$ and $\alpha_2$ (precisely, a sum thereof calculated by a symbol Σ). These $\alpha_1$ and $\alpha_2$ become 0 for a dark color pixel and 1 for a light color pixel.

That is, when either one (or both) of $\alpha_1$ and $\alpha_2$ is 0, $\alpha_1 \alpha_2 \{f_1 (x, y) - f_2(x-i, y-j)\}^2$ becomes 0.

This means that, when either one (or both) of the two pieces of the paper fingerprint information has a dark object pixel, intensity difference between the object pixels is not considered. This is for neglecting pixels which have dust or color material thereon.

This processing changes the number of terms summed up by the symbol Σ, and therefore, in the right side of the formula 1, the total number of the terms Formula 3

$$\sum_{x,y} \alpha_1(x, y)\alpha_2(x-i, y-j) \quad (3)$$

divides

Formula 4

$$\sum_{x,y} \alpha_1(x, y)\alpha_2(x-i, y-j)\{f_1(x, y) - f_2(x, y)\}^2 \quad (4)$$

to perform normalization. Here, an error value set (E(−(n−1), −(m−1)) to E (n−1, m−1)) to be described below does not include an error value E (i, j) in a case the formula 3, which is the denominator of the formula 1, becomes 0.

<A method for Determining the Matching Level>

As described above, when E (k, l)=min {E (i, j)}, it is found that the position where the registered paper fingerprint information was acquired and the position where newly acquired paper fingerprint information was acquired are shifted from each other by k and l.

Next, a matching level of the two pieces of the paper fingerprint information can be obtained by use of E (k, l) thereof and the other E (i, j).

First, from the error value set obtained by the function of the formula 1 (e.g., E (0, 0)=10, E (0, 1)=50, E (1, 0)=50, and E (1, 1)=50), an average value (40) is obtained . . . . (A)

Note that the values of (A) are shown only for examples and the present embodiment is not limited by these values in any way.

Subsequently, each error value (10, 50, 50, 50) is subtracted from the average value (40) to generate a new set (30, −10, −10, −10) . . . . (B)

Then, from this new set, a standard deviation (30×30+10× 10+10×10+10×10=1200, 1200/4=300, is obtained. Then, by dividing the new set by 17, a quotient is obtained as (1, −1, −1, −1) . . . . (C)

Then, the maximum value of the obtained above values is defined to be the matching level (in the above example, the matching level is 1). Here, the value 1 of the matching level corresponds to a value of E (0, 0)=(10), which is a value to satisfy E (0, 0)=min {E (i, j)} in this case.

<Conceptual Description of the Method for Determining the Matching Level>

The above described processing to determine the matching level is, conceptually in the end, to calculate how different is the smallest error value, in a set of a plurality of error values, from an average value thereof ((A) and (B)).

Then, the matching level is obtained by dividing the difference by the standard deviation (C).

In the last, a collation result is obtained by comparing the matching level with the threshold value.

Here, the standard deviation means an average value of "differences between error values and an average value". In other words, the standard deviation is a value representing what level of variations exists in the whole set.

By dividing the above differences by such a variation value of the whole set, it becomes clear how small min {E (i, j)} is (outstandingly small or slightly small) in the set of E (i, j).

Then, when min {E (i, j)} is outstandingly small in the set of E (i, j), the paper fingerprint information to be collated is determined to be valid and otherwise invalid (D).

<Reason of Validity Only in a Case Min {E (i, j)} is Outstandingly Small in the Set E (i, j)>

Here, it is assumed that the registered paper fingerprint information and the paper fingerprint information to be collated have been acquired from the same paper.

Then, there should be a position (shift position) where the registered paper fingerprint information and the paper fingerprint information to be collated coincide closely with each other. Accordingly, at this shift position, E (i, j) should become very small because the registered paper fingerprint information and the paper fingerprint information to be collated coincide closely with each other.

On the other hand, when shifted even a little from this shift position, the registered paper fingerprint information and the paper fingerprint information to be collated do not have any correlation. Accordingly, E (i, j) should have a usual large value in this case.

Therefore, the condition "two pieces of the paper fingerprint information have been acquired from the same paper" coincides with the condition "the smallest E (i, j) is outstandingly small in the set of E (i, j)".

<Description of an Operation Screen>

FIG. 19 shows an initial screen of the operation unit 12 in the image forming apparatus 10 shown in FIG. 1. An area 1301 shows whether the image forming apparatus 10 is ready for copying, and also shows a set number of copies. A document selection tab 1304 is a tab for selecting a type of a document, and pressing this tab generates a pop-up display of a menu for three kinds of selections; character, photograph, and character/photograph. A finishing tab 1306 is a tab for making a setting regarding various kinds of finishing modes. A double-side setting tab 1307 is a tab for making a setting regarding both-side reading and both-side printing. A reading-mode tab 1302 is a tab for selecting a mode of reading a document. Pressing this tab generates a pop-up display of a menu for three kinds of selections; color/black/automatic (ACS). Here, if the color is selected, color copying is carried out, and if the black is selected, monochrome copying is carried out. Also, if the ACS is selected, a copying mode is determined by the color/monochrome determination signal described hereinabove.

An area 1308 is a tab for selecting a paper fingerprint information registration processing. An area 1309 is a tab for selecting the paper fingerprint information collation processing.

<Entire Flow of the Paper Fingerprint Registration Processing in Consideration of the Imposition Information>

Figure 24:
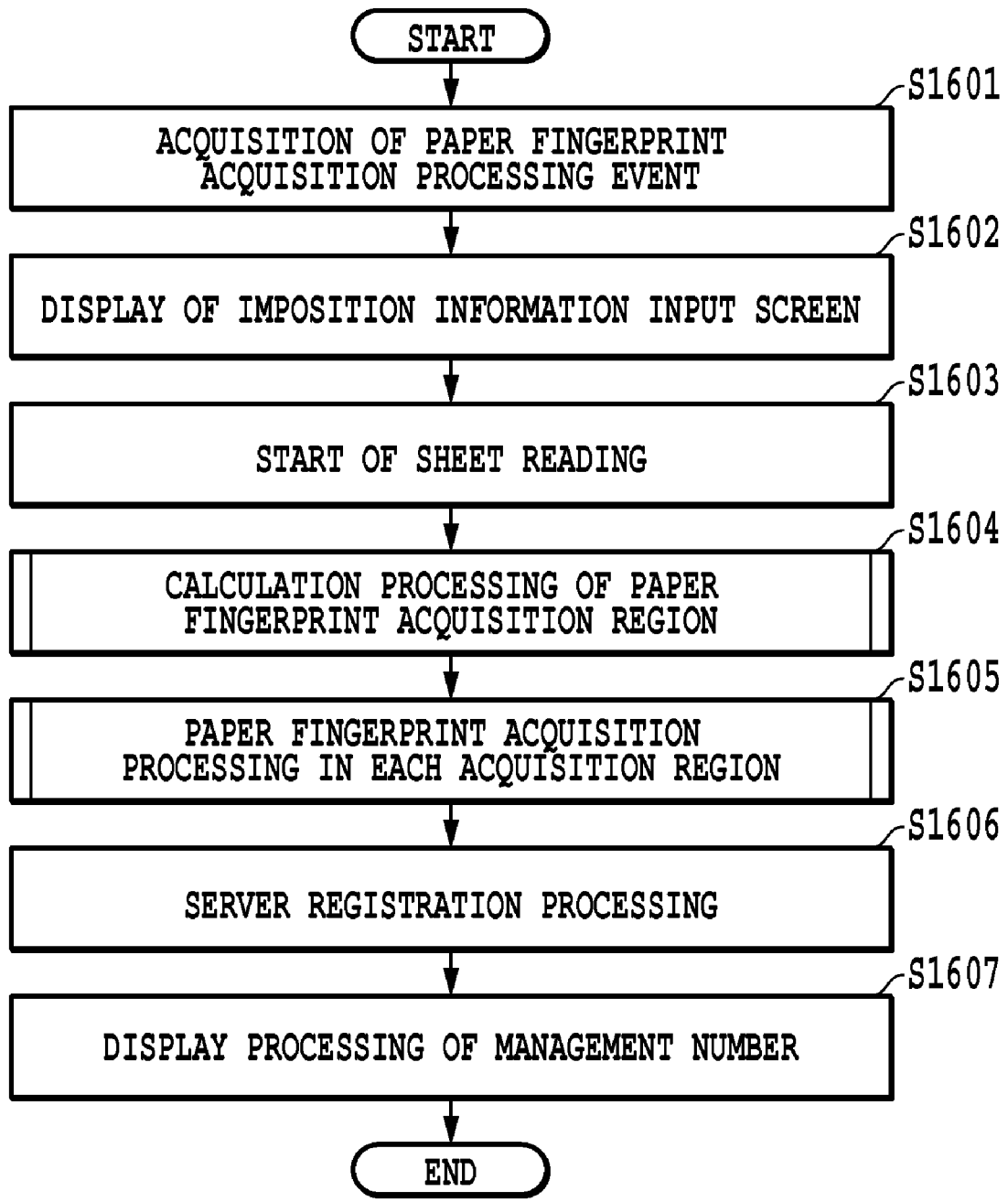
FIG. 24 is an entire flowchart of paper fingerprint registration processing in consideration of imposition information according to the embodiment 1 of the present invention.

FIG. 24 shows an entire flow of the paper fingerprint registration processing in consideration of the sheet imposition information according to the embodiment 1 of the present invention. Processing of each step will be described below. The CPU 301 sequentially reads out data retained in the RAM 302 and collectively controls each step of the flowchart.

In FIG. 24, a step S1601 performs processing to make the controller 11 of the image forming apparatus 10 shown in FIG. 1 acquire a paper fingerprint acquisition processing event. Specifically, the event is acquired by user's press-down of the area 1308 in the operation unit 12 described with reference to FIG. 19. Next, a step S1602 performs processing to display an imposition information input screen on the operation unit 12 shown in FIG. 1.

Figure 25:
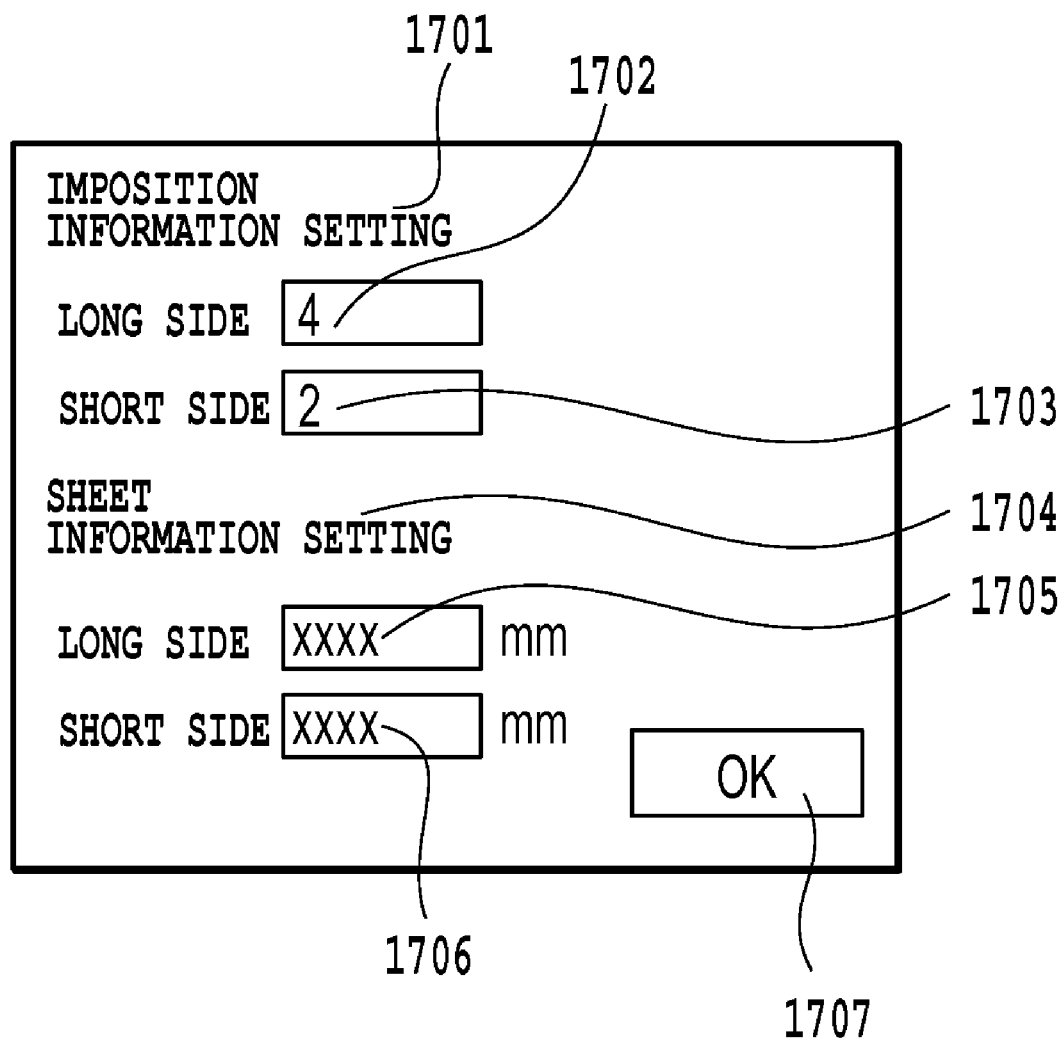
FIG. 25 is a diagram showing an example of an imposition information input screen according to the embodiment 1 of the present invention.

FIG. 25 shows exemplary diagram of the imposition information input screen. Here, an area 1701 shows that the screen shown in FIG. 25 relates to imposition information setting. An area 1702 is an input area for the number of documents laid-out in the long side direction of a sheet. An area 1703 is an input area for the number of documents laid-out in the short side direction. An area 1704 shows that a part of the screen relates to sheet information setting. An area 1705 is an input area for a length of the long side of a sheet. An area 1706 is an input area for a length of the short side of a sheet. A button 1707 is an OK button to confirm the input contents. The sheet information setting part shown by Symbols 1704 to 1706 is used in a case the sheet information is required to be specified preliminarily. The sheet information setting part needs not be prepared particularly in the printing system which can precisely acquire the sheet information when the sheet is read by the scanner unit 13 shown in FIG. 1. Also, the imposition information is not limited to the numbers in the long side and short side directions, and it is possible to add an input item of a shift width in consideration of a cutting shift.

A step S1603 shown in FIG. 24 performs processing to start reading a sheet, and the next step S1604 performs processing to calculate a region for acquiring a paper fingerprint. Details of the processing will be described below. Subsequently, a step S1605 performs processing to acquire the paper fingerprint in the paper fingerprint acquisition region calculated in the step S1604. This processing is performed by the paper fingerprint acquisition region calculation unit, and details of the paper fingerprint acquisition region calculation unit will be described below. Next, a step S1606 performs processing to transmit the paper fingerprint information acquired in the step S1605 to the sever 20 via the LAN 30 or the WAN. The sever stores the transmitted paper fingerprint information. Subsequently, a step S1607 performs processing to display a management number for the registered paper fingerprint on the operation unit 12. The image forming apparatus 10 acquires the management number issued by the server 20 for each paper fingerprint via the LAN 30 or the WAN, and displays the management number on the operation unit 12. After that, when a user sets a sheet having a registered paper fingerprint in a manual tray, one of sheet trays (not shown in the drawings), this sheet is carried in and a corresponding management number is printed on a part of each face having a registered paper fingerprint.

<Paper Fingerprint Acquisition Region Calculation Unit>

Figure 26:
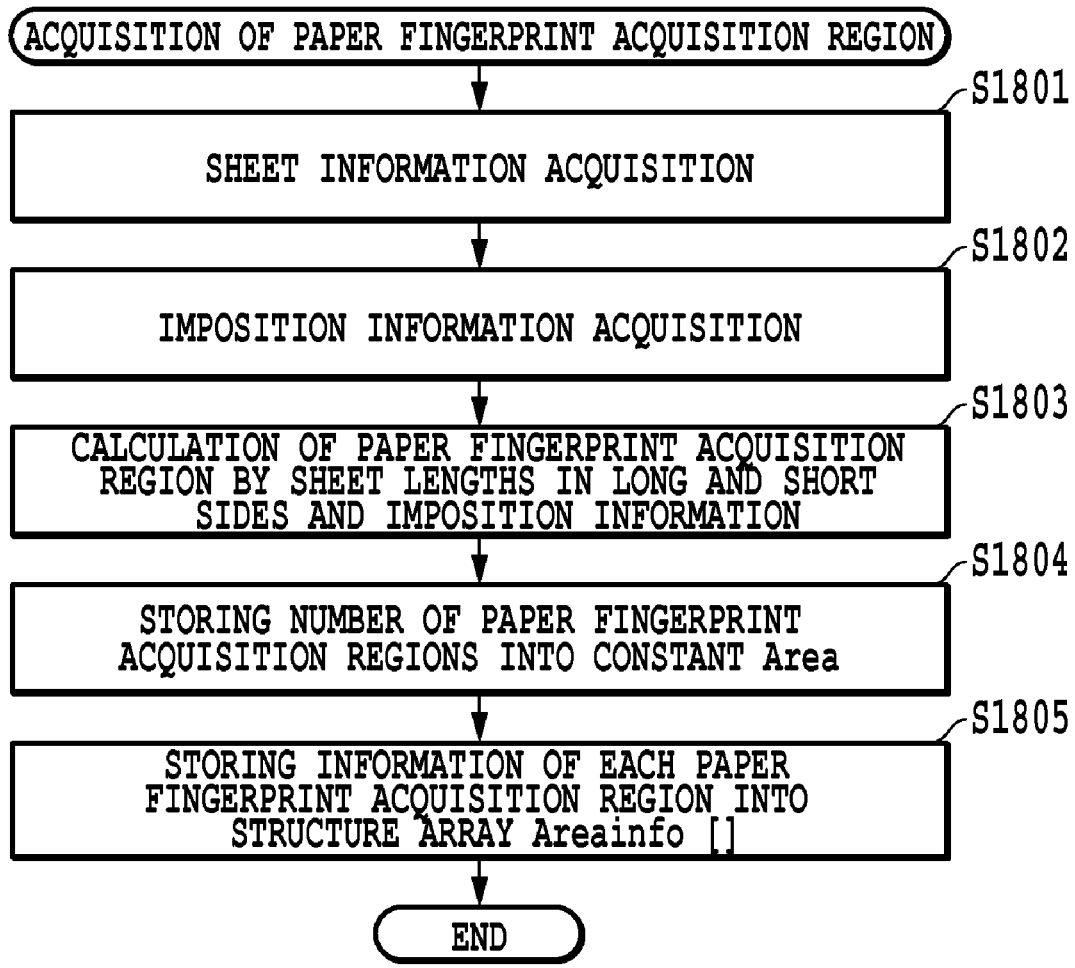
FIG. 26 is a diagram showing a flowchart of processing performed by a paper fingerprint acquisition region calculation unit according to the embodiment 1 of the present invention.

FIG. 26 shows a detailed flowchart of processing performed by the paper fingerprint acquisition region calculation unit described in the step S1604 shown in FIG. 24. Processing of each step will be described below.

A step S1801 performs processing to acquire sheet information. The controller 11 acquires the information set in the above described areas 1704 to 1706 shown in FIG. 25. The sheet information may be acquired from the scammer unit 13, in a case the information can be acquired from the scanner unit 13 via the scanner I/F 311 when the scanner unit 13 reads the sheet. Next, a step S1802 performs processing to acquire the imposition information. The controller 11 acquires the information set in the above described areas 1701 to 1703 shown in FIG. 25. A step S1803 performs processing to calculate the paper fingerprint acquisition region on the basis of the sheet information acquired in the step S1801 and the imposition information acquired in the step S1802.

Specifically, the number of regions for paper fingerprint acquisition and a range of the region are calculated. First, a method for calculating the number of the acquisition regions will be described. The CPU 301 shown in FIG. 3 calculates the number of the regions by multiplying the long side and short side imposition information input in the areas 1702 and 1703 shown in FIG. 25. When four documents are imposed on the long side and two documents are imposed on the short side, the number of regions is calculated as 4×2=8. Next, a calculating method for the range of the region will be described. The range is represented by coordinates from an origin which is set at the upper left of a read sheet.

Figure 27:
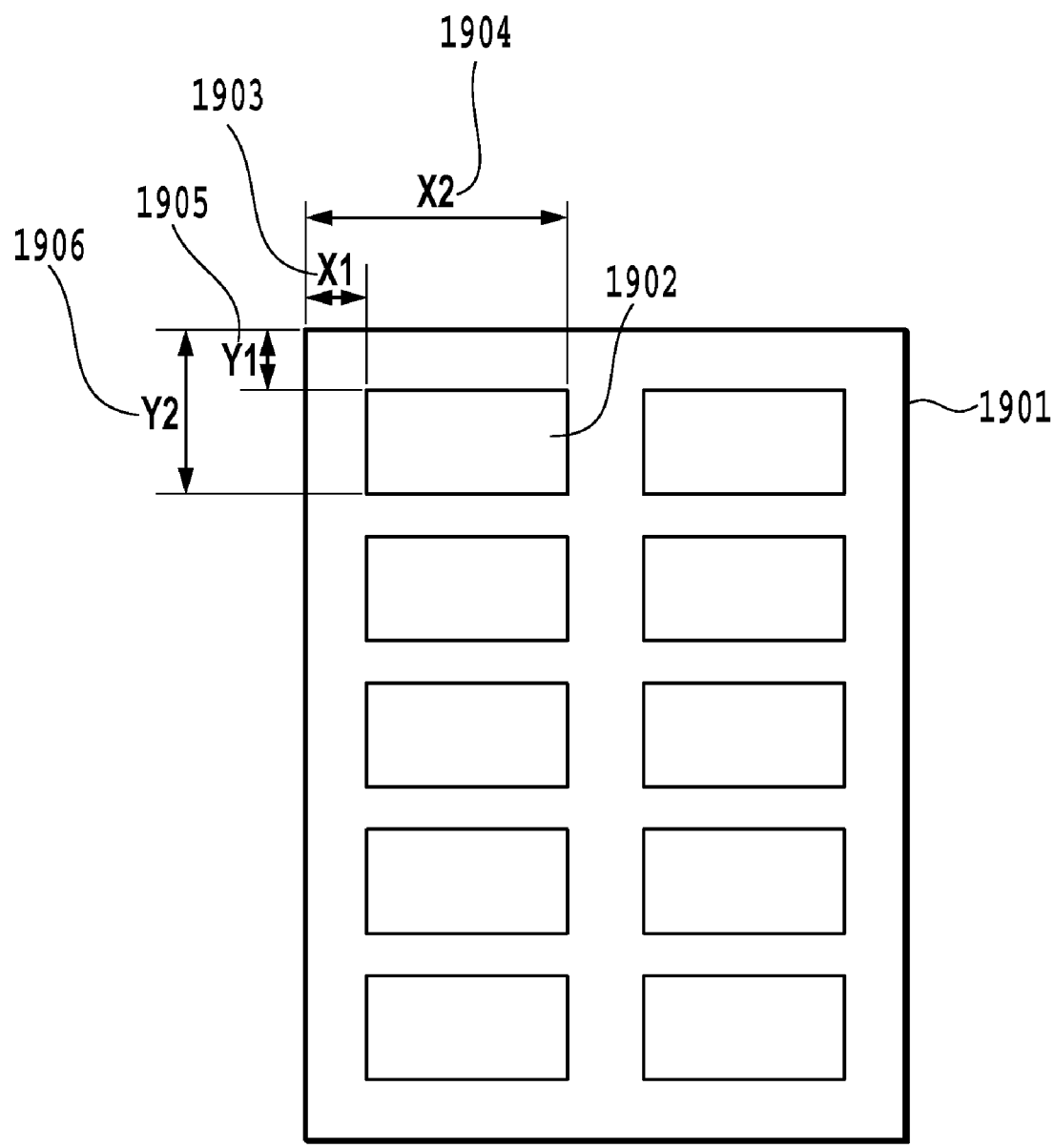
FIG. 27 is a diagram showing a concept of calculating a range of the paper fingerprint acquisition region according to the embodiment 1 of the present invention.

FIG. 27 shows a conceptual diagram of calculating the range of the acquisition region. FIG. 27 is an example of a diagram showing a sheet 1901 imposed with 10 pages of document data, and shows a conceptual diagram of the range of an acquisition region 1902. An origin is set at the upper left corner of the sheet and coordinates of the upper left and lower right corners of the acquisition region are calculated. The acquisition region is defined with the two coordinates. The upper left coordinates of the acquisition region 1902 are (X1, Y1) as shown by Symbols 1903 and 1905. Also, the lower right coordinates of the acquisition region 1902 are (X2, Y2) as shown by Symbols 1904 and 1906. Accordingly, the range of the acquisition region 1902 is (X1,Y1)–(X2,Y2). The CPU 301 shown in FIG. 3 as follows calculates the coordinates from a long side length of the sheet and the imposition information in the long side direction. For example, when the long side length is 200 mm and the imposition information is 2, the range in the long side direction may be determined to be 0 to 100 mm and 101 to 200 mm by a simple division (200/2=100). Actually, however, the acquisition range should not include an effective print area when the image forming apparatus prints a sheet or the above described cutting width in the sheet cutting. Accordingly, more accurate coordinates of the acquisition region can be obtained by eliminating such information from the acquisition region calculated as described above. In this manner, the coordinates of the acquisition region are calculated for the number of the acquisition regions.

Next, a step S1804 performs processing to store the number of the paper fingerprint acquisition regions calculated in the step S1803 into a constant area. A name of the constant is determined arbitrarily. Subsequently, a step S1805 performs processing to store the range information of the paper fingerprint acquisition region calculated in the step 1803 into a structure array AreaInfo [ ]. Here, each of the acquisition regions is stored in each of the structures. Therefore, when there are 10 acquisition regions, the range information of the paper fingerprint acquisition regions is stored into AreaInfo [1] to AreaInfo [10].

Thereby, the acquisition region corresponding to each image data (final product) imposed on a sheet is stored into AreaInfo [ ]. The structures AreaInfo [ ] include, as members, AreaInfo [ ]. c1 storing upper left coordinates of the acquisition range, AreaInfo [ ]. c2 storing lower right coordinates, and AreaInfo [ ]. cp storing a position of a paper fingerprint acquired in the acquisition range. Also, the structures AreaInfo [ ] have a member storing error information when a paper fingerprint region can not be acquired in the acquisition region. Also, the structures have a member storing access information to the paper fingerprint information stored in the RAM 302 shown in FIG. 3. Here, while the present embodiment refers to the structures as AreaInfo [ ], the name of the structures may be determined arbitrarily. Also, while the present embodiment refers to the members as AreaInfo [ ]. c1, AreaInfo [ ]. c2 and AreaInfo [ ] cp, the name of the member may be determined arbitrarily.

A step S1805 performs processing to store the calculated coordinates of the acquisition region into AreaInfo [ ]. c1 and AreaInfo [ ]. c2. Into AreaInfo [ ]. cp, data is stored in a step S2011 shown in FIG. 28 to be described below.

<Paper Fingerprint Acquisition Processing in each Acquisition Region>

Figure 28:
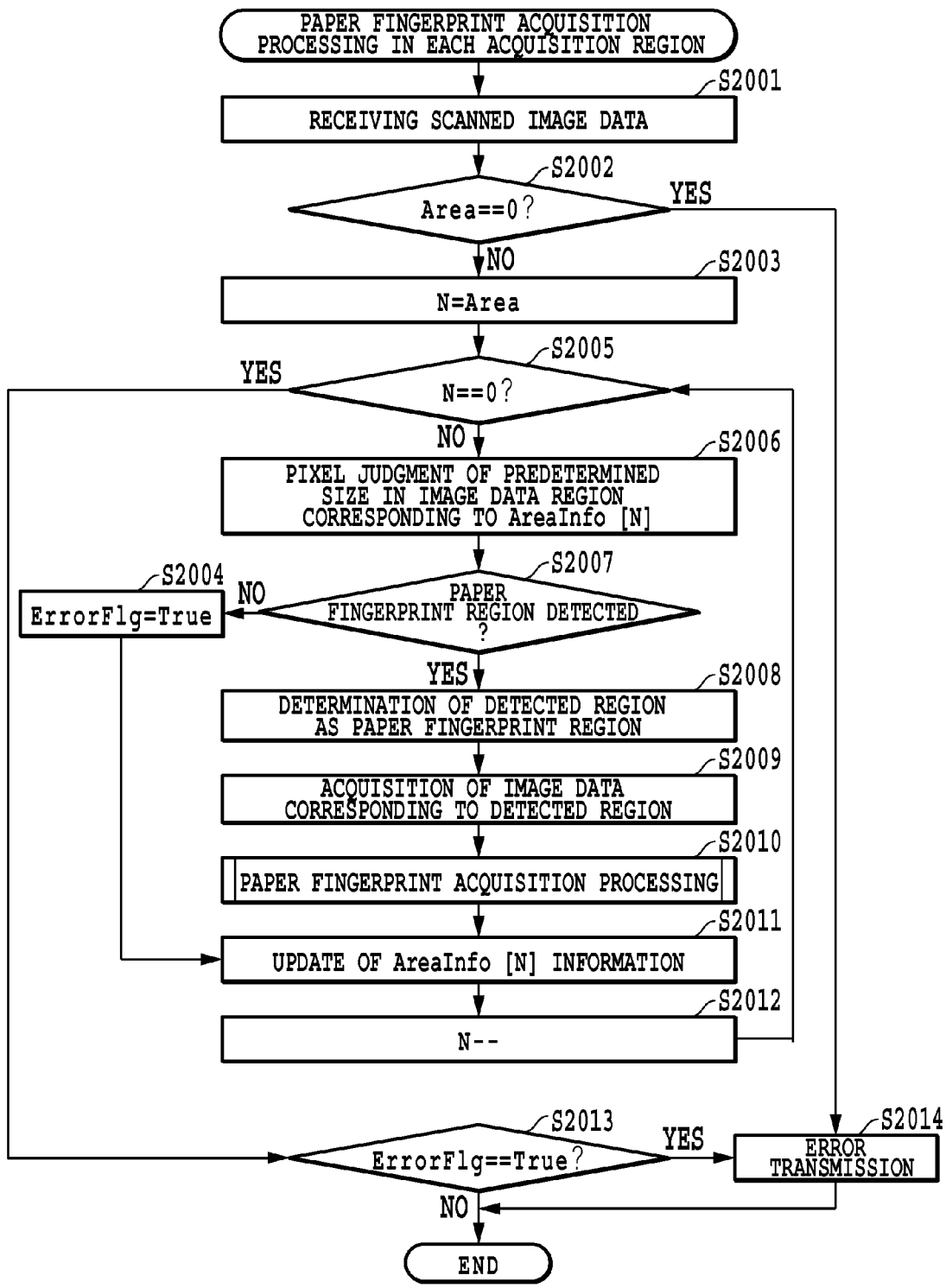
FIG. 28 is a flowchart of paper fingerprint acquisition processing in each of the acquisition regions according to the embodiment 1 of the present invention.

FIG. 28 shows a detailed flow of the paper fingerprint acquisition processing in each of the paper fingerprint acquisition regions described in association with the step S1605 shown in FIG. 24. Processing of each step will be described below with reference to FIG. 28.

A step S2001 performs processing to make the scanner image processing unit 312 receive image data read in the scanner unit 13 via the scanner I/F 311. Next, a step S2002 performs processing to determine whether the value stored into the constant area in the step S1804 shown in FIG. 26 is zero or not. If the value stored in the constant area is not zero, the process goes to a step S2003. If the value stored in the constant area is zero, the process goes to a step S 2014. When the value stored in the constant area is zero, there is no region for paper fingerprint acquisition, and therefore the paper fingerprint acquisition processing can not be performed and the process goes to the step S2014. Details of the step 2014 will be described below. The step S2003 performs processing to substitute the constant area for a variable N. A step S2005 performs processing to determine whether the variable N is zero or not. If the variable N is zero, the process goes to a step S2013. If the variable N is not zero, the process goes to a step S2006.

The step S2006 performs processing to judge pixels having a predetermined size within the image data received in the step S2001 in the range of the acquisition region stored in AreaInfo [N]. Here, the predetermined size is a size of the paper fingerprint to be acquired. The pixel judgment is a judgment whether pixels included in the predetermined size are appropriate for the paper fingerprint. For example, when all the pixels included in the predetermined size are black, the fiber information in the paper fingerprint region probably can not be detected and the pixels are not appropriate. Next, a step S2007 performs processing to determine whether or not a paper fingerprint region judged to be the appropriate paper fingerprint region in the judgment processing in the step S2006 is detected. If the paper fingerprint region is detected, the process goes to a step S2008. If the paper fingerprint region is not detected, the process goes to a step S2004.

The step S2004 performs processing to set ErrorFlg to True. The case in which a paper fingerprint region has not been detected means that the paper fingerprint acquisition has failed in the acquisition region. Accordingly, in this step, ErrorFlg is set to True for outputting an error. A step S2008 performs processing to determine the detected region to be a paper fingerprint region. A step S2009 performs processing to extract and acquire image data corresponding to the region determined in the step S2008 from the image data acquired in the step S2001.

A step S2010 performs the paper fingerprint acquisition processing described above. The step S2010 performs processing to generate and acquire the paper fingerprint information on the image data acquired in the step S2009. Next, the step S2011 performs processing to store the upper left coordinates of the paper fingerprint region determined in the step S2008 into the paper fingerprint acquisition position information AreaInfo [N]. cp of AreaInfo [N]. Also, when ErrorFlg is set to True in the step S2004, the error information is stored into the structure AreaInfo [ ].

Figure 29:
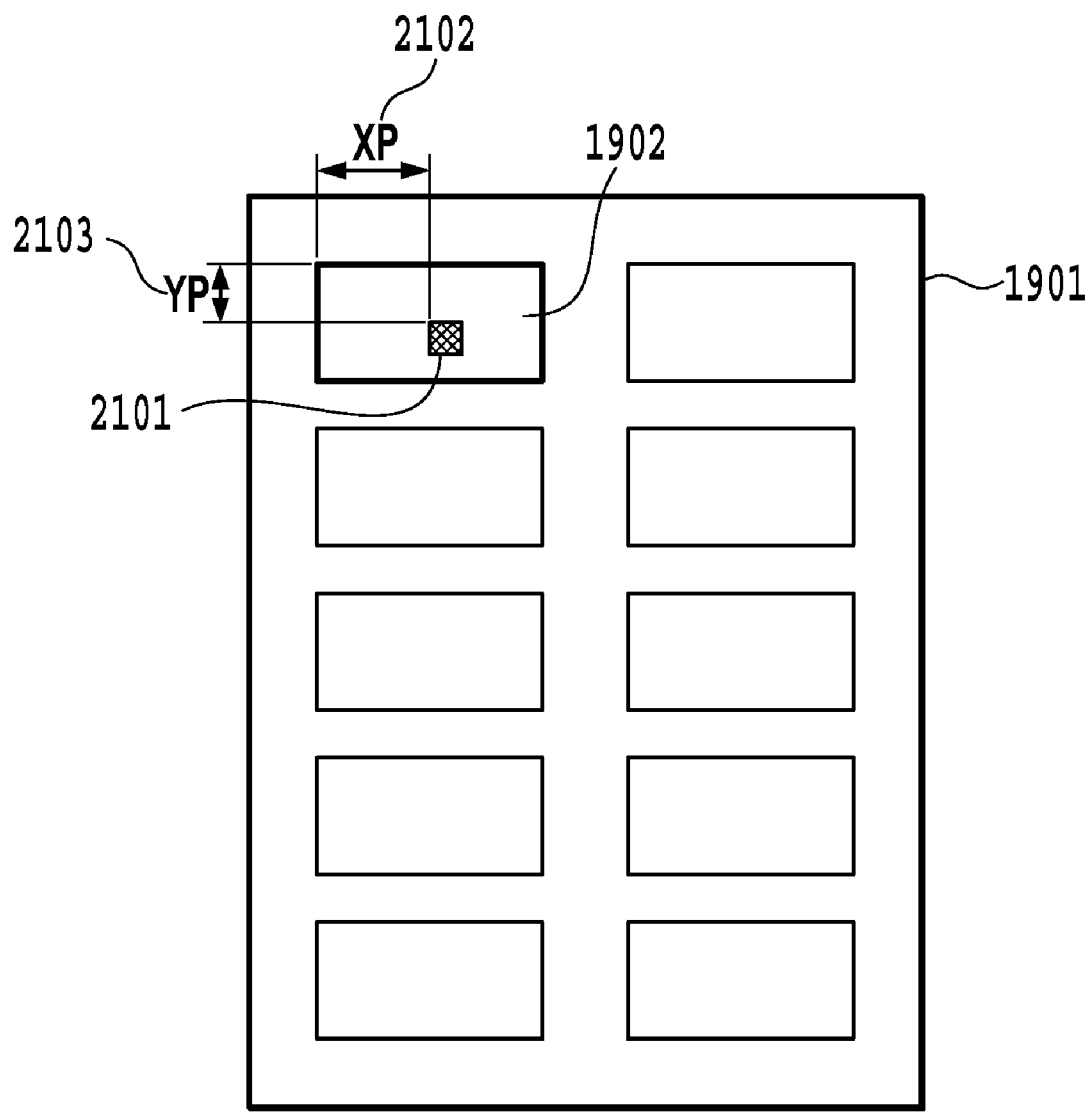
FIG. 29 is a conceptual diagram of coordinates of the paper fingerprint region according to the embodiment 1 of the present invention.

FIG. 29 shows a conceptual diagram of the coordinates of the paper fingerprint region treated in the step S2008 shown in FIG. 28. The coordinates of the paper fingerprint region are calculated in the X direction (XP 2102) and the Y direction (YP 2103) from an origin at the upper left of the acquisition region 1902. The reason is that the position needs to be calculated in consideration of a cut area for specifying the position of the paper fingerprint region for the paper fingerprint collation.

A step S2012 shown in FIG. 28 provides processing to decrement the variable N. By performing the steps S2005 to S2012 as described above repeatedly, the paper fingerprint acquisition processing is performed in the number of times corresponding to the number of regions for the paper fingerprint to be acquired. The acquired paper fingerprint information is sequentially retained by the RAM 302 shown in FIG. 3. A reference address of the paper fingerprint information retained by the RAM 302 is stored into corresponding AreaInfo [N]. When the paper fingerprint processing is completed for all the regions, the process goes to a step S2013. The step S2013 performs processing to determine whether ErrorFlg is set to True or not. In a case in which the paper fingerprint region is not detected in any one of the acquisition regions, ErroFlg is set to True and the process goes to a step S2014. When the paper fingerprint region is detected in all the acquisition regions, the processing of FIG. 28 is terminated. This means that the paper fingerprint region can be detected without fail for each document data (final product) corresponding to the acquisition region on the sheet.

The step S2014 provides processing to report the error to the operation unit 12 via the operation unit I/F 305 for notifying the user of the failure in the paper fingerprint acquisition. The error reported from the controller 11 to the operation unit 12 may be treated differently between a case in which the process goes from the step S2002 to the step S2014 and a case in which the process goes from the step S2013 to the step S2014. For example, when no acquisition region is defined in the step S2002 and the process goes to the step S2014, the following processing may be performed. That is, in this case, the CPU 301 shown in FIG. 3 may notify the operation unit of the error by indicating to display an error message (warning) such as "No paper fingerprint acquisition region defined". Also, when ErrorFlg is determined to be set to True in the step S2013 and the process goes to the step S2014, the following processing may be performed. That is, in this case, the CPU 301 shown in FIG. 3 may notify the operation unit of the error by indicating to display an error message (warning) such as "Paper fingerprint detection failed in acquisition region XXX". Also, for the paper fingerprint acquisition processing that has the above error, the following step S1606 of FIG. 24, the step S1607 for server registration, and management number display processing are skipped.

<Entire Flow of the Paper Fingerprint Information Collation Processing>

Figure 30:
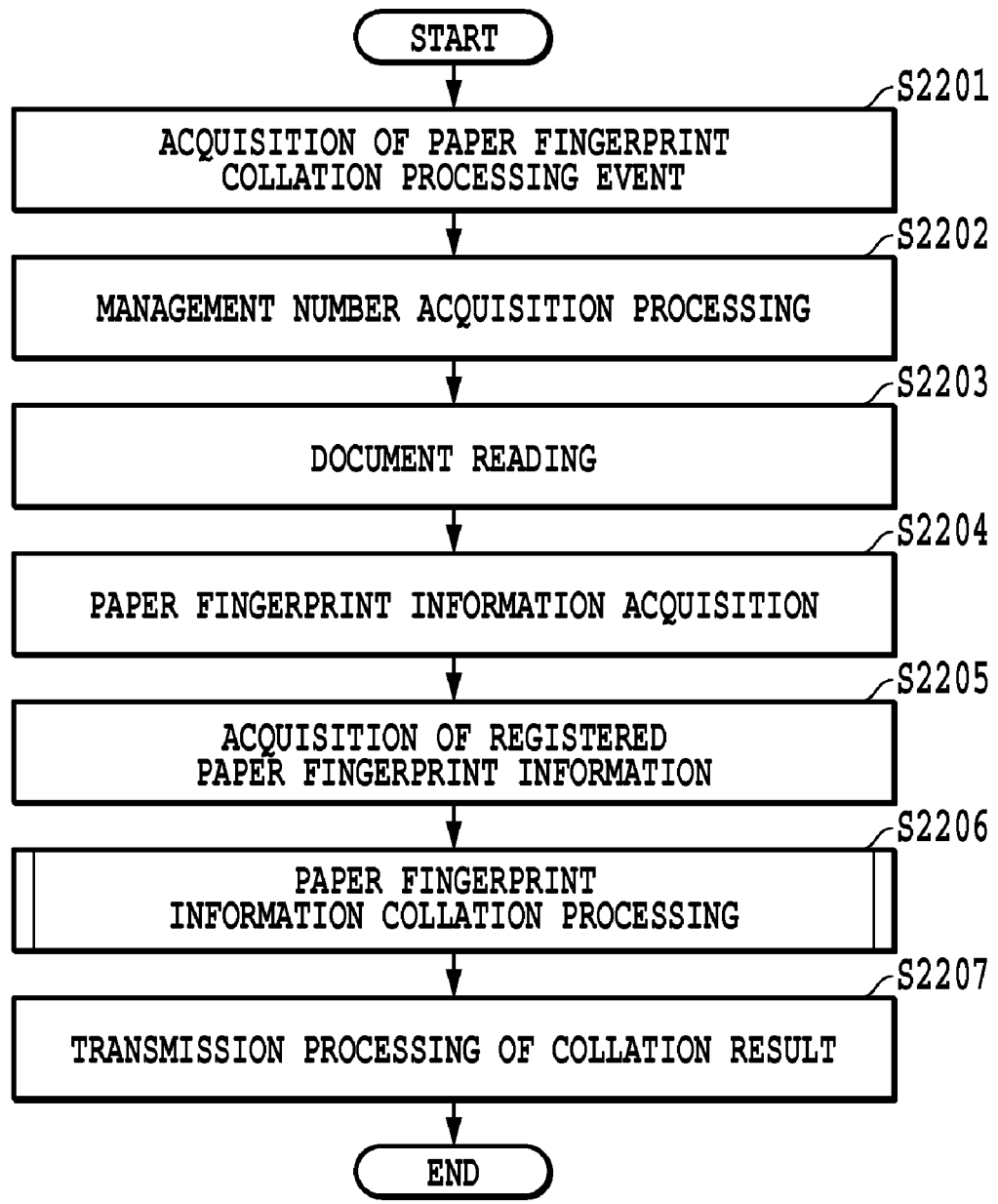
FIG. 30 is an entire flowchart of the paper fingerprint collation processing according to the embodiment 1 of the present invention.

FIG. 30 shows the entire flow of the paper fingerprint information collation processing according to the embodiment 1 of the present invention. Processing of each step will be described below. In each step of the flowchart, the CPU 301 shown in FIG. 3 sequentially reads out data retained in the RAM 302 and performs the processing collectively.

Figure 31:
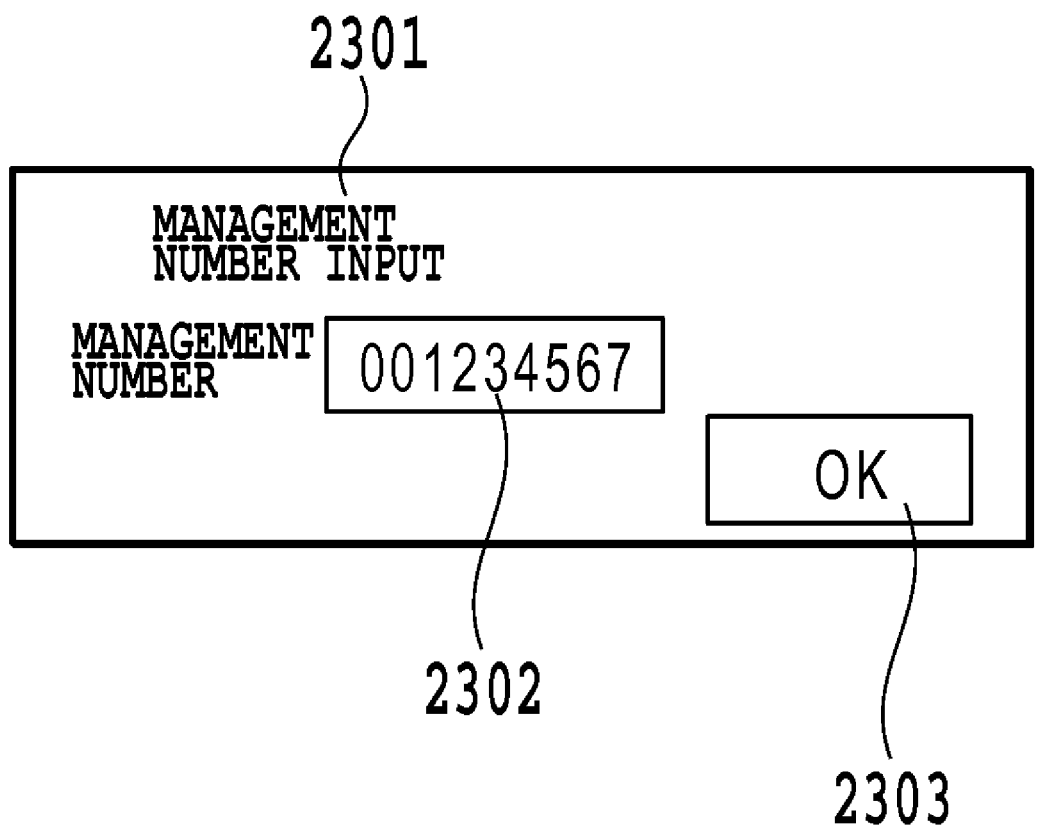
FIG. 31 is a diagram showing an example of a management number input screen according to the embodiment 1 of the present invention.

A step S2201 performs processing to make the controller 11 of the image processing apparatus 10 acquire an event of the paper fingerprint collation processing. Specifically, the area 1309 of the operation unit 12, described with reference to FIG. 19, acquires the event pressed-down by the user. Next, a step S2202 performs processing to acquire a management number input in the operation unit 12 via the operation unit I/F 305. Here, the user inputs the management number printed on a sheet and the management number input from the input screen of the operation unit 12 is used in the processing. FIG. 31 shows an exemplary diagram of the management number input screen. An area 2301 shows a management number input part. An area 2302 shows an area for the management number input. An area 2303 shows an OK button to confirm the input contents. Next, a step S2203 performs processing to make the CPU 301 control image data of the document read by the scanner unit 13 to be transmitted to the scanner image processing unit 312 via the scanner I/F 311.

Subsequently, a step S2204 performs the paper finger print acquisition processing on the image data read in the step S2203. First, the CPU 301 shown in FIG. 3 acquires the paper fingerprint information corresponding to the management number acquired in the step S2202 from the server 20 and determines the paper fingerprint information acquisition region. Then, the paper fingerprint information acquisition unit 507 in the scanner image processing unit 312 shown in FIG. 3 acquires the paper fingerprint information from the paper fingerprint information acquisition region determined above. Lastly, the acquired paper fingerprint information is sent to the RAM 302 via the data bus (not shown in the drawings). Next, a step S2205 performs processing to acquire the paper fingerprint information registered in the server and acquired in the step S2204. The acquired paper fingerprint information is sent to the RAM 302 via the data bus (not shown in the drawings). Subsequently, a step S2206 performs the paper fingerprint information collation processing described with reference to FIG. 8. The step S2206 performs processing to collate the paper fingerprint to be collated which has been acquired and retained by the RAM 302 in the step S2205 and the paper fingerprint registered in the server 20. A step S2207 performs processing to transmit the collation result (valid or invalid) obtained in the step S2206 to the operation unit 12 via the operation unit I/F 305.

(Embodiment 2)

Figure 32:
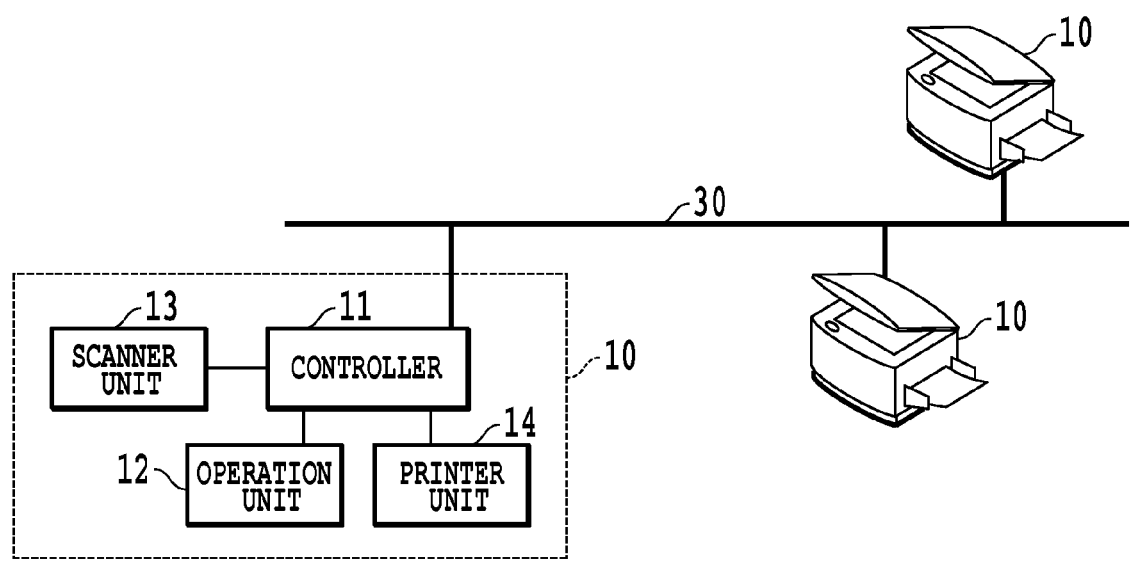
FIG. 32 is a diagram showing an example of a printing system including an image forming apparatus according to an embodiment 2 of the present invention.

FIG. 32 is a block diagram showing a printing system including an image forming apparatus according to an embodiment 2 of the present invention. In the printing system shown in FIG. 32, three image forming apparatuses 10 are connected to a LAN 30. While three image forming apparatuses are connected to the printing system shown in FIG. 1, only one image forming apparatus may be connected to the printing system according to the embodiment 2. Although the embodiment 2 uses the LAN for a connection method, the connection method is not limited to the LAN. The connection method may be any network such as a WAN (public line), a serial transmission method such as USB, a parallel transmission method such as Centronics or SCSI, or the like.

The image forming apparatus 10 includes a scanner unit 13 which is an image input device, a printer unit 14 which is an image output device, a controller 11 which controls the whole operation of the image forming apparatus 10, and an operation unit 12 which serves as a user interface (UI).

A different point between the embodiment 1 and the embodiment 2 is that the printing system of embodiment 2 does not have the server 20 shown in FIG. 1.

<Entire Flow of the Paper Fingerprint Registration Processing in Consideration of the Imposition Information>

The embodiment 1 employs a configuration to store the acquired paper fingerprint information in the server. On the other hand, the embodiment 2 employs a server-less configuration, and prints the acquired paper fingerprint information on a sheet as coded information. The coded information is typically realized by two-dimensional code information. The two-dimensional code information includes a two dimensional barcode and a QR code, but any other code may be used as far as the two-dimensional code information can be retained.

Figure 33:
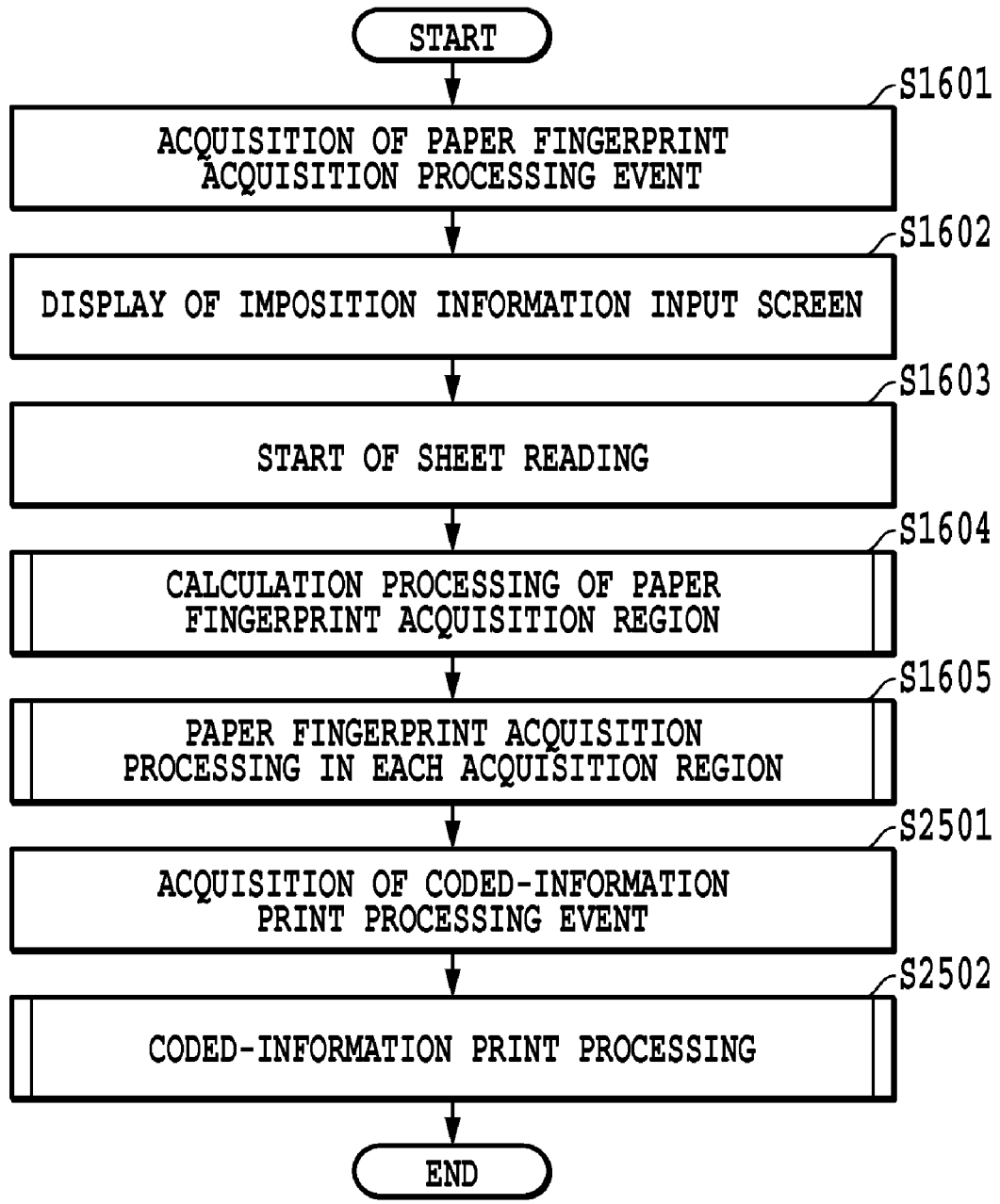
FIG. 33 is an entire flowchart of a paper fingerprint registration processing in consideration of imposition information according to the embodiment 2 of the present invention.

FIG. 33 shows an entire flow of the paper fingerprint registration processing in consideration of the imposition information according to the embodiment 2 of the present invention. Processing of each step will be described below. In each step of the flowchart, the CPU 301 shown in FIG. 3 sequentially reads out data retained in the RAM 302 and performs processing collectively.

Figure 34:
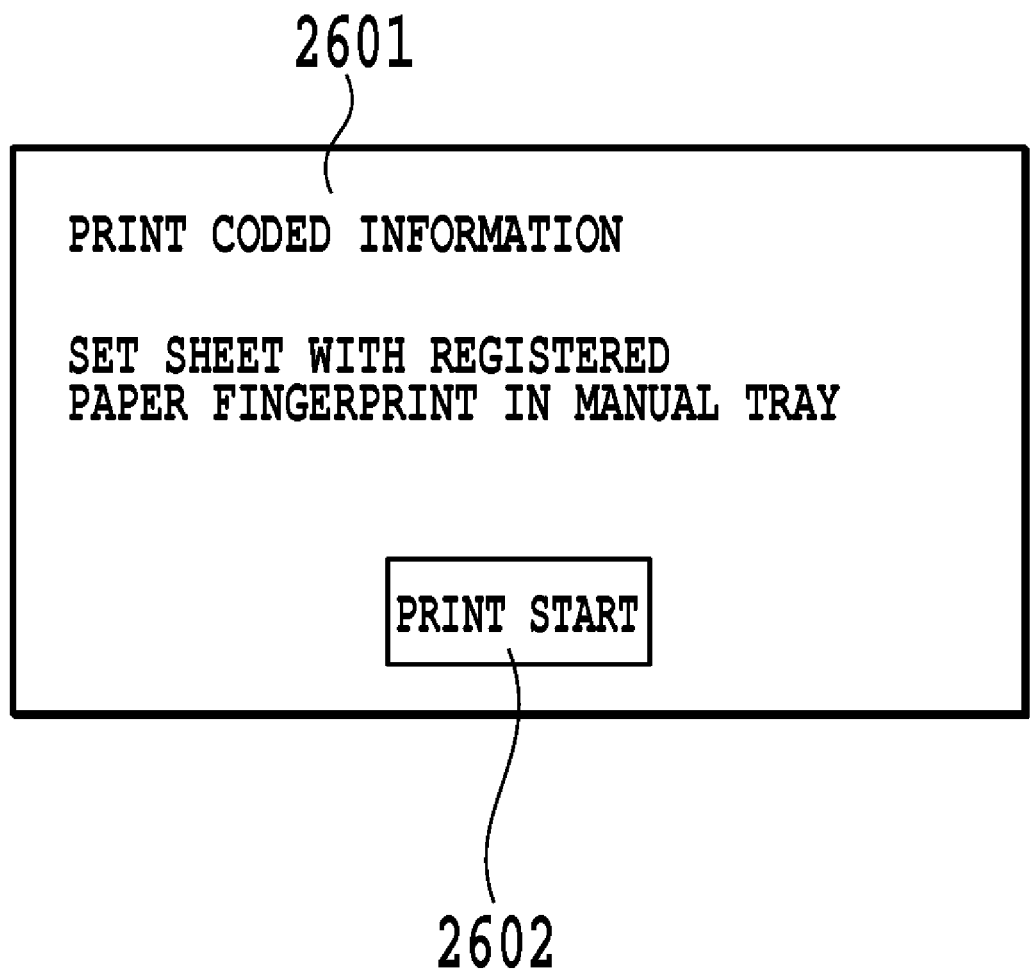
FIG. 34 is a diagram showing an example of an instruction screen of coded information printing according to the embodiment 2 of the present invention.

Each step of steps S1601 to S1605 is the same as that shown in FIG. 24 which is used for description of the above-mentioned embodiment 1 and description thereof will be omitted. A step S2501 performs processing to acquire an event of printing the coded information on a sheet to discriminate the paper fingerprint information. FIG. 34 shows an exemplary diagram for specifying the coded information printing in the operation unit 12. An area 2601 is an area for indicating the coded information printing to a user. An area 2602 is an area for notifying the event of starting the coded information printing. By user's press-down of this area, the event of coded information print processing is notified to the controller 11 via the operation unit I/F 305. A step S2502 performs processing to draw a sheet to be printed with the coded information from the manual tray and to print the coded information. Details of the coded information print processing will be described below.

<Coded Information Print Processing>

Figure 35:
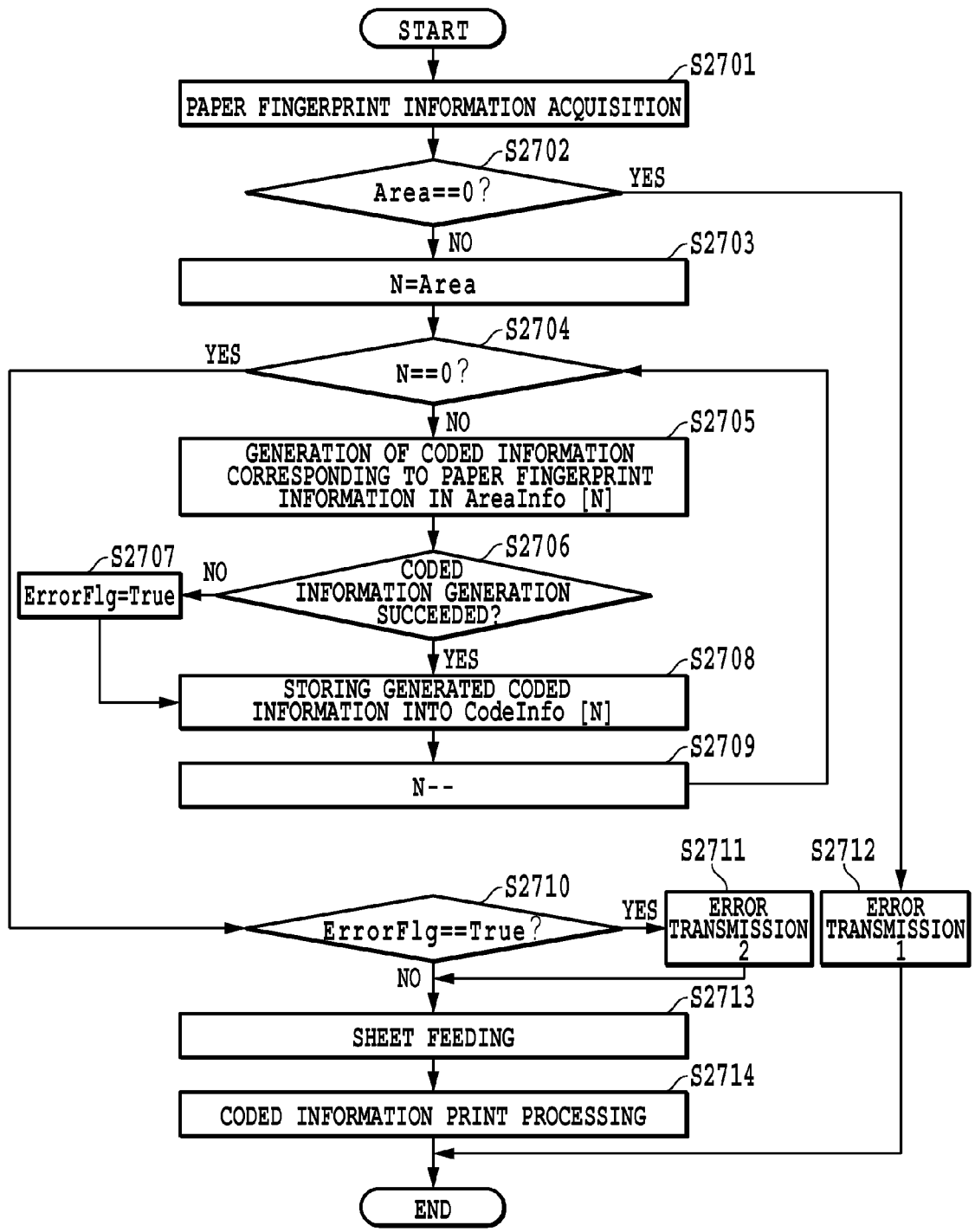
FIG. 35 is a flowchart of the coded information print processing according to the embodiment 2 of the present invention.

FIG. 35 shows a flow of the coded information print processing according to the present invention. Processing of each step will be described below. In each step of the flowchart, the CPU 301 shown in FIG. 3 sequentially reads out data retained in the RAM 302 and performs processing collectively.

A step S2701 performs processing to read out the paper fingerprint information retained in the RAM 302 which has been acquired in the step S1605 shown in FIG. 33. A step S2702 performs processing to determine whether or not the value stored in the constant area in the step S1605 shown in FIG. 33 is zero. If the value stored in the constant area is not zero, the process goes to a step S2703. If the value stored in the constant area is zero, the process goes to a step S2712. When the value stored in the constant area is zero, the number of acquired paper fingerprints is shown to be zero, and thereby the coded information print processing can not be performed and the process goes to a step S2712. The step S2712 will be described below. The step S2703 performs processing to substitute the constant area for the variable N. A step S2704 performs processing to determine whether or not the variable N is zero. If the variable N is zero, the process goes to a step S2710. If the variable N is not zero, the process goes to a step S2705.

The step S2705 provides processing to generate the coded information corresponding to the paper fingerprint information in AreaInfo [N]. The position coordinates of the paper fingerprint information stored in AreaInfo [N] and the corresponding paper fingerprint information retained in the RAM 302 shown in FIG. 3 are read out and the coded information is generated. A method for generating the coded information is publicly known in Japanese Patent Laid-Open No. 2004-214831 described hereinabove and description thereof will be omitted.

Next, a step S2706 performs processing to determine whether or not coded information generation processing in the step S2705 has succeeded. If the coded information generation has succeeded, the process goes to a step S2708. If the coded information generation has failed, the process goes to a step S2707. The step S2707 performs processing to set ErrorFlg to True. When the coded information could not be generated, this processing set ErrorFlg to True for outputting an error. After the processing of ErrorFlg, the process goes to a step S2708.

The step S2708 performs processing to store access information to the coded information generated in the step S2705 and retained in the RAM 302 shown in FIG. 3 into CodeInfo [N]. CodeInfo [N] is an array retaining the access information to the coded information. Subsequently, a step S2709 performs processing to decrement the variable N. By carrying out the steps S2704 to S2709 in this manner repeatedly, the coded-information generation processing is performed in the number of times corresponding to the number of pieces of the coded information to be generated. After the coded information generation processing has been completed for all pieces of the paper fingerprint information, the process goes to a step S2710. The step S2710 provides processing to determine whether or not ErrorFlg is set to Ture. If the coded information generation processing has not succeeded for any piece of the paper fingerprint information, ErrorFlg is set to True and the process goes to a step S2711. If the coded information generation processing has succeeded for all the pieces of the paper fingerprint information, the processing of FIG. 35 is terminated.

A step S2711 and a step S2712 provide processing to report the error to the operation unit 12 via the operation unit I/F 305 to notify the user of the failure in the coded information generation processing.

The error reported from the controller 11 to the operation unit 12 is processed differently between a case in which the process comes from the step S2702 to this processing and a case in which the process comes from the step S2710 to this processing. If ErrorFlg is judged to be set to True in the step S2710, the process goes to a step S2711. In the step S2711, the error is reported such that the operation unit can display an error message (warning) such as "Coded information generation failed in acquisition region XXX". If no paper fingerprint information is acquired in the step S2702, the process goes to a step S2712. In the step S2712, the error is reported such that the operation unit can display an error message (warning) such as "No paper fingerprint for coded information generation".

A step S2713 performs processing to feed the sheet set in the manual tray. A step S2714 performs processing to print the coded information generated in the steps S2704 to S2709 on the sheet fed in the step S2713. On the basis of the access information to the coded information stored in CodeInfo [N], the corresponding coded information is read out from the RAM 302 shown in FIG. 3 and printed. A printing method of the coded information is publicly known in the above described Japanese Patent Laid-Open No. 2004-214831 and description thereof will be omitted.

<Entire Flow of the Paper Fingerprint Collation Processing>

Figure 36:
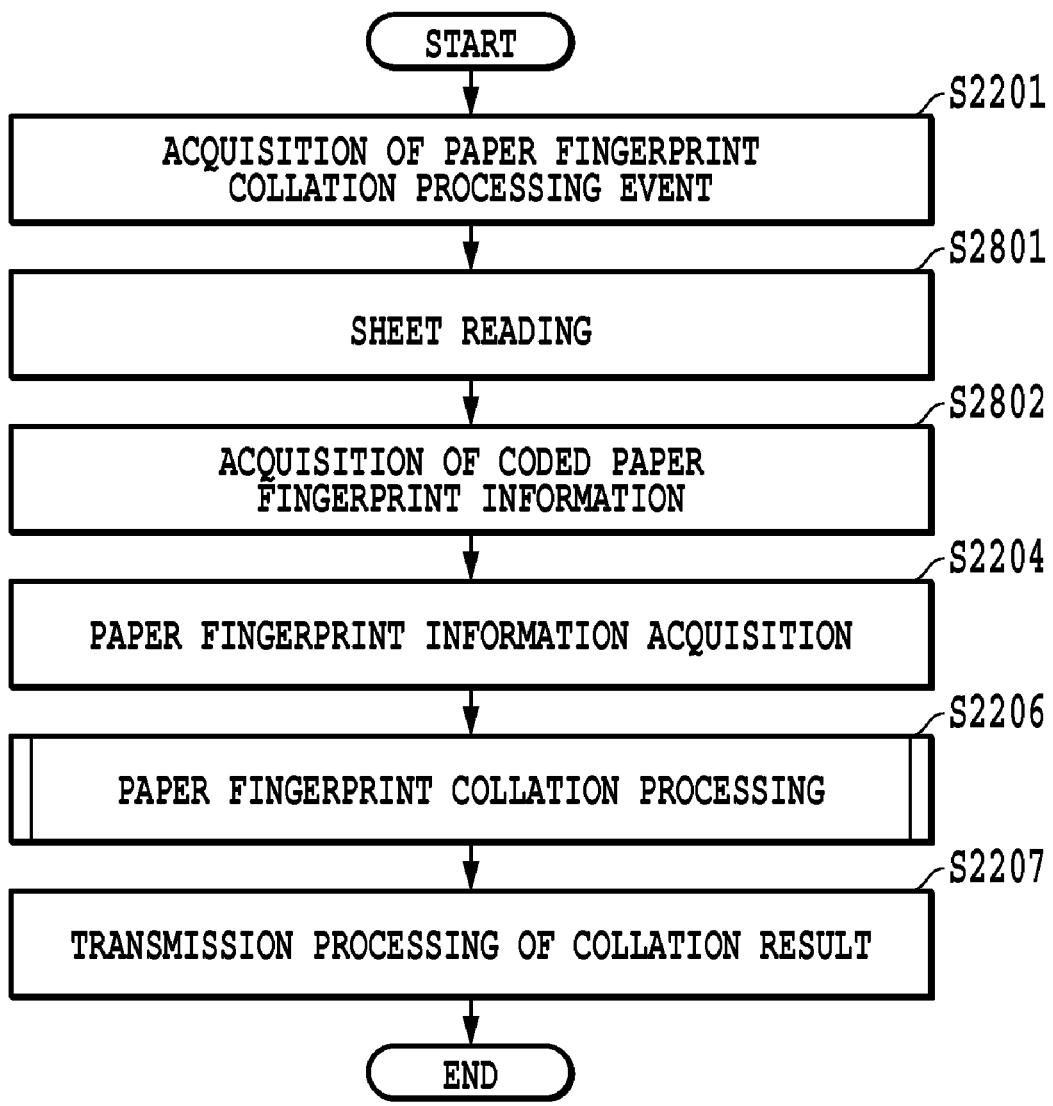
FIG. 36 is an entire flowchart of a paper fingerprint collation processing according to the embodiment 2 of the present invention.

FIG. 36 shows an entire flow of the paper fingerprint collation processing according to the embodiment 2 of the present invention. Processing of each step will be described. In each step of the flowchart, the CPU 301 shown in FIG. 3 sequentially reads out data retained in the RAM 302 and performs the processing collectively.

The processing of each of a step S2201, a step S2204, and steps S2206 to S2207 are the same as that in FIG. 30 showing the entire flowchart of the paper fingerprint collation processing in the above described embodiment 1, and detailed description thereof will be omitted.

A step S2201 acquires an event of the paper fingerprint collation processing and starts the collation processing. Next, in a step S2801, the CPU 301 shown in FIG. 3 sends image data of a document read by the scanner unit 13 to the scanner image processing unit 312 via the scanner I/F 311. At the same time, the CPU 301 sends the coded information printed on the document read in the scanner unit 13 to the RAM 302 using the data bus (not shown in the drawings). Subsequently, a step S2802 reads out the coded information retained in the RAM 302 in the step S2801 and performs processing to decode the coded information and to acquire the paper fingerprint information. Next, a step S2204 performs processing to acquire the paper fingerprint information on the image data read in the step S2801 on the basis of the coordinate information of the paper fingerprint obtained by decoding the coded information. The step S2206 performs processing to collate the paper fingerprint information acquired in the step S2802 and the paper fingerprint information acquired in the step S2204. Then, a step S2207 performs processing to transmit the collation result to the operation unit 12.

(Embodiment 3)

Figure 37:
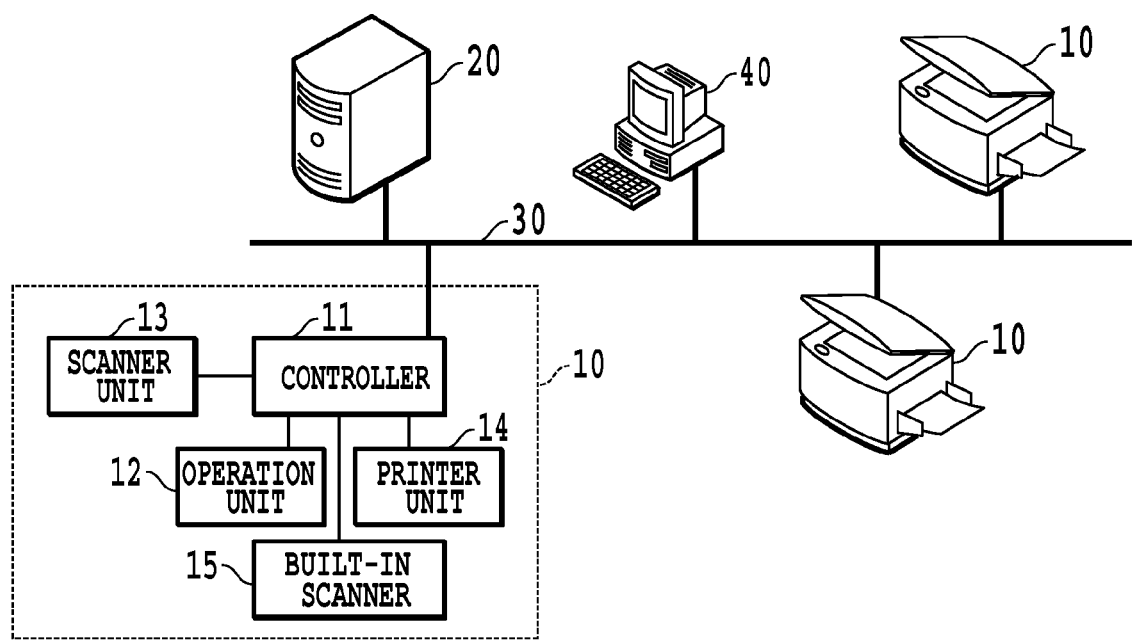
FIG. 37 is a diagram showing an example of a printing system including an image forming apparatus according to an embodiment 3 of the present invention.

FIG. 37 is a block diagram showing a printing system including an image forming apparatus according to an embodiment 3 of the present invention. In the printing system shown in FIG. 37, three image forming apparatuses 10, a sever 20, and a client PC 40 are connected to a LAN 30. While the three image forming apparatuses are connected to the printing system shown in FIG. 1 according to the embodiment 1, at least one image forming apparatus, one server, and one client PC may be connected to the printing system according to the embodiment 3. Although the embodiment 3 employs a LAN for a connection method, the connection method is not limited to the LAN. The connection method may be any network such as a WAN (public line), a serial transmission method such as a USB, a parallel transmission method such as Centronics or SCSI, or the like.

Figure 38:
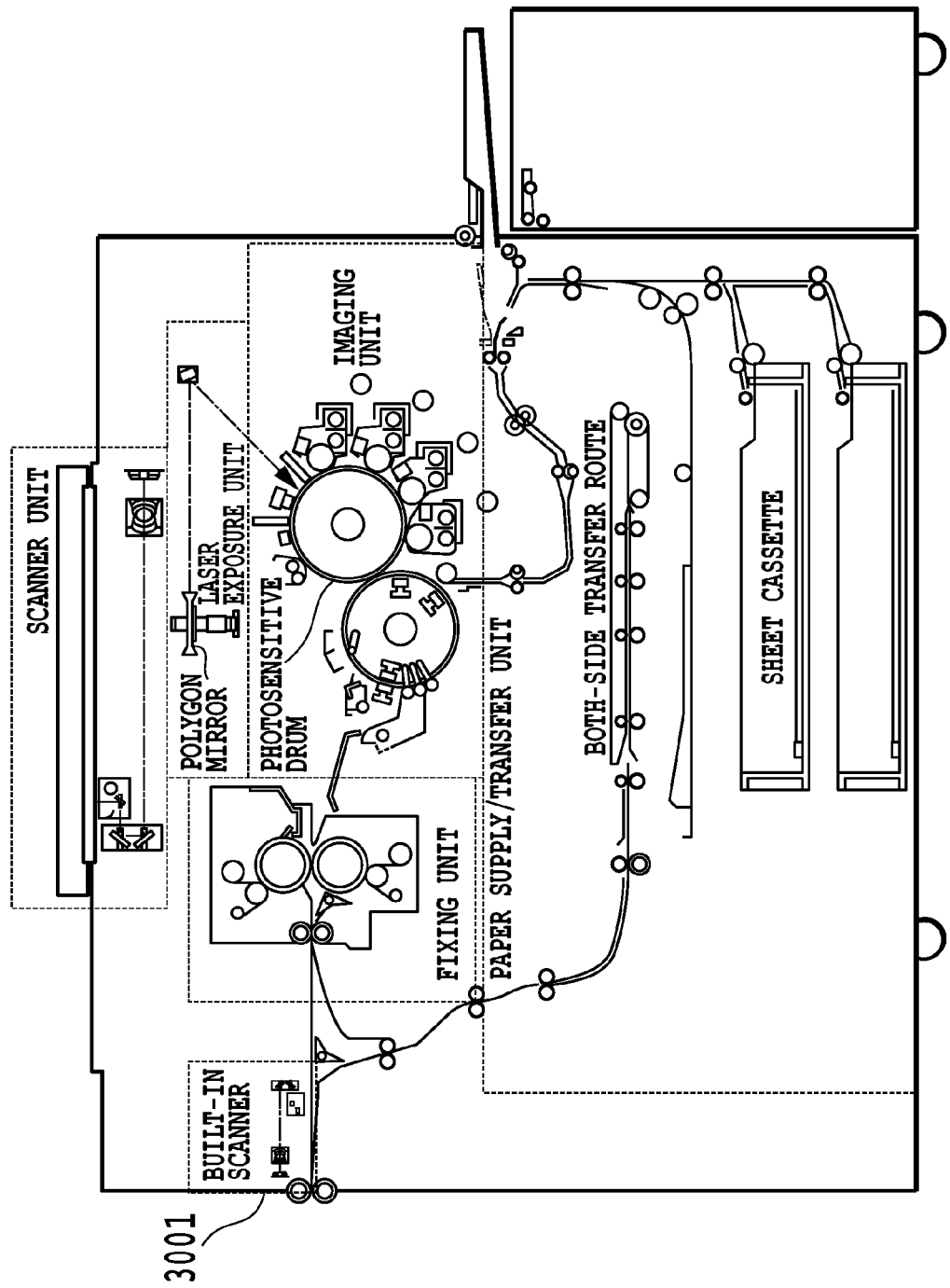
FIG. 38 is a diagram showing an example of an inside of the image forming apparatus according to the embodiment 3 of the present invention.

The image forming apparatus 10 includes a scanner unit 13 which is an image input device, a printer unit 14 which is an image output device, a controller 11 which controls the whole operation of the image forming apparatus 10, and an operation unit 12 which serves as a user interface (UI). A different point from the embodiments 1 and 2 is that the embodiment 3 includes a built-in scanner 3001 in addition to the scanner unit 13. FIG. 38 shows an internal structure of the image forming apparatus 10 according to the embodiment 3. Here, the scanner unit 3001 is mounted inside the apparatus. Thereby, it becomes possible to read a document inside the apparatus before the document is discharged after printing.

<Entire Flow of the Paper Fingerprint Registration Processing in Consideration of Imposition Information>

The embodiment 3 is an embodiment including the built-in scanner 3001 in the image forming apparatus 10, performs a series of processing to receive a print indication from a user to print on a document, to read the document, to acquire a paper fingerprint, and to process paper fingerprint registration.

Figure 39:
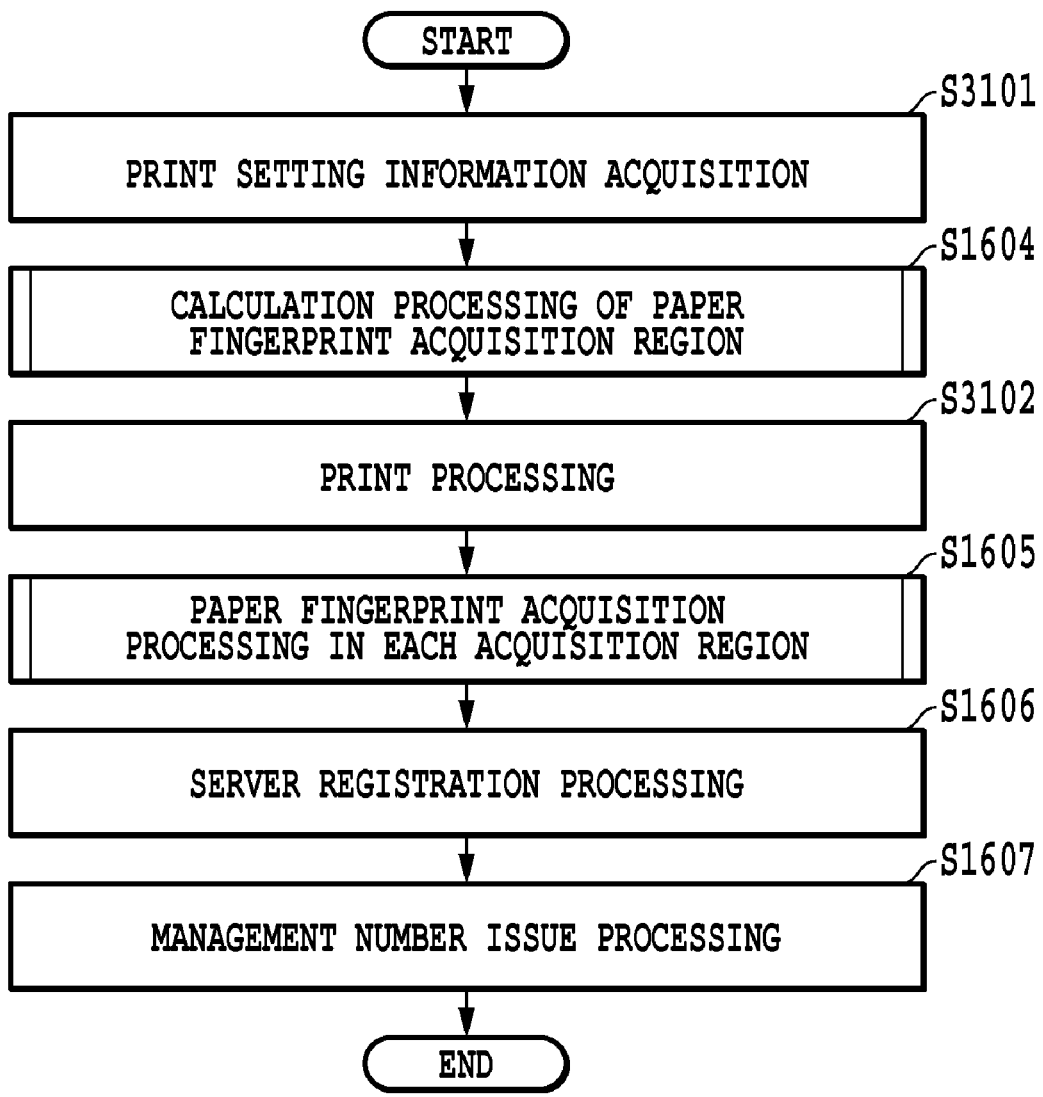
FIG. 39 is an entire flowchart of a paper fingerprint collation processing according to the embodiment 3 of the present invention.

FIG. 39 shows an entire flow of the paper fingerprint registration processing in consideration of sheet imposition information according to the embodiment 3 of the present invention. Processing of each step will be described below. In each step of the flowchart, the CPU 301 shown in FIG. 3 sequentially reads out data retained in the RAM 302 and controls the step collectively.

A step S3101 performs processing to make the image forming apparatus 10 shown in FIG. 37 acquire print setting information specified by the client PC 40. A specifying method of the print setting information by the client PC 40 may be realized by any software as far as a print setting and a print instruction to the image forming apparatus can be performed. Typically, a printer driver or the like can be used for specifying the print setting information. Also, the software used for specifying the print setting information transmits information for a series of processing of printing, recording-paper reading, paper fingerprint acquisition and paper fingerprint registration processing in the embodiment 3 to the image forming apparatus.

Figure 40:
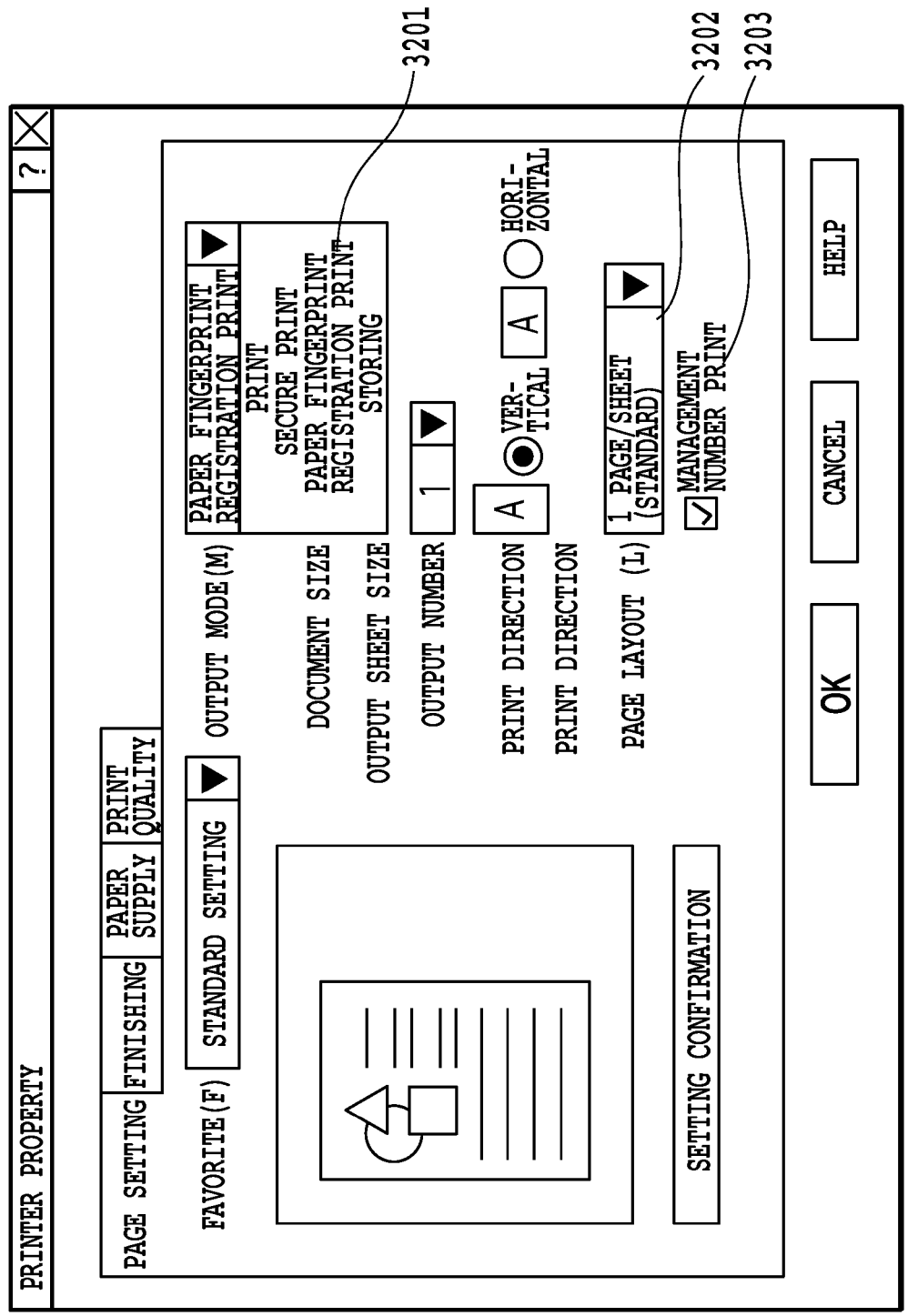
FIG. 40 is a diagram showing an example of a printer driver screen according to the embodiment 3 of the present invention.

FIG. 40 shows an exemplary screen of the printer driver. Here, Symbol 3201 shows an indication part for specifying an output method. When "paper fingerprint registration print" is specified in the indication part 3201, the image forming apparatus 10 is notified to perform the above described series of processing. Symbol 3202 shows an indication part specifying a page layout setting. The page layout specifying part 3202 specifies imposition (page layout) information, and the specified information is notified to the image forming apparatus 10. Also, Symbol 3203 is a specifying part specifying whether management number printing is performed or not. Here, the management number printing is a function printing the management number, issued by the server 20 in the above described step S1607 shown in FIG. 24 for discriminating the registered paper fingerprint, onto a recording-paper (final product). By printing the management number on the final product, the user need not remember the management number. The image forming apparatus 10 shown in FIG. 37 sends the acquired print setting information to the RAM 302 shown in FIG. 3 via the data bus (not shown in the drawings).

A step S1604 performs processing to take out the print setting information (page layout) acquired in the step S3101 from the RAM 302 and to calculate the paper finger print acquisition region by the paper fingerprint acquisition region calculation unit. Processing performed by the step S1604 is the same as the processing shown in FIG. 26 used for the description of the embodiment 1. A step 3102 provides typical print processing in the image forming apparatus 10. The image data received from the client PC 40 shown in FIG. 37 is printed on the recording-paper on the basis of the print setting information acquired in the step S3101. A step S1605 provides processing to acquire a paper fingerprint in each of the paper fingerprint acquisition regions corresponding to each of the pages (image to be laid out) calculated in the step S1604. Processing performed by the step S1604 is the same as that in FIG. 28 used for the description of the embodiment 1. Note that the processing of the step 2001 shown in FIG. 28 becomes a processing in which the scanner image processing unit 312 receives the image data read by the built-in scanner 3001 via the data bus (not shown in the drawings).

A step S1606 and a step S1607 perform the same processing as that in FIG. 24 of the embodiment 1. The step S1606 transmits the paper fingerprint information acquired in the step S1605 to the server 20 and the step S1607 displays the management number issued by the server 20 on the operation unit 12. In the step S1606, when transmitting the paper fingerprint information to the server 20, the CPU 301 shown in FIG. 3 transmits the management number information together with the paper fingerprint information to the server 20 if the above described management number printing function is effective. The server 20 manages the received paper fingerprint information using the management number received from the image forming apparatus 10. Also in the step S1607, the management number issued by the image forming apparatus may be displayed on the operation unit 12 if the management number printing is effective. Note that, since the management number is printed on the final product by the management number printing function, the step S1607 may be omitted.

A feature of the embodiment 3 is to perform printing on a recording paper, recording-paper reading, paper fingerprint acquisition, and paper fingerprint registration processing in a series of processing using the built-in scanner 3001. If this series of processing is realized, arrangement of devices employed by the embodiment 3 needs not be limited to that shown in the above description. For example, the print setting information may be transmitted from the client PC 40 to the operation unit 12 on the image forming apparatus. Also, the management number print processing described in the embodiment 3 may be performed by the paper fingerprint registration in the server 20 as same as in the embodiment 1.

(Other Embodiments)

Further, according to the other embodiments of the present invention, it is also possible to form a printing system according to the present invention using an apparatus (multi-functional machine, printer, and facsimile apparatus) including a plurality of devices (e.g., computer, interface device, reader, printer, etc.) or a single device.

Also, an object of the present invention is achieved by a configuration in which a computer executes a program code read out from a storage medium that stores a program code realizing the steps of the flowchart shown in the foregoing embodiments. In this case, the program code read out from the storage medium realizes the foregoing functions of the embodiments by itself. Therefore, this program code and the storage medium storing the program code can fall within the scope of the present invention.

Storage media for supplying a program code include, for example, a floppy disk (registered trade mark), hard disk, optical disk, magneto-optical disk, CD-ROM, CD-R, magnetic tape, non-volatile memory card, ROM, etc.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2007-164082, filed Jun. 21, 2007, which is hereby incorporated by reference herein in its entirety.

What is claimed is:

1. An image processing apparatus comprising:
    an imposition information acquisition unit that acquires imposition information;
    a paper fingerprint acquisition region calculation unit that calculates a plurality of regions of a sheet for the acquisition of paper fingerprints according to the imposition information acquired by said imposition information acquisition unit, a number of the regions of the sheet for the acquisition of paper fingerprints corresponding to a number of images printed on the sheet after dividing a dimension of the sheet by a number representing the imposition information;
    a paper fingerprint information acquisition unit that acquires the paper fingerprints, a number of which corresponds to the number of images printed on the sheet after dividing the dimension of the sheet by a number representing the imposition information, according to the regions calculated by said paper fingerprint acquisition region calculation unit; and
    an error report unit that reports an error when it is impossible to obtain a fingerprint on at least one of the acquisition regions existing on each of a plurality of pieces of paper obtained by cutting the sheet.

2. The image processing apparatus according to claim 1, wherein said paper fingerprint information acquisition unit corrects the coordinates of a position of at least one of the acquisition regions of the paper fingerprint.

3. The image processing apparatus according to claim 1, wherein said paper fingerprint acquisition region calculation unit calculates said regions on the basis of an effective print area and a shift width in cutting of the sheet in the region calculation.

4. An image processing apparatus comprising:
    an imposition information acquisition unit acquiring imposition information;
    a paper fingerprint acquisition region calculation unit that calculates a plurality of regions of a sheet for the acquisition of paper fingerprints according to the imposition information acquired by said imposition information acquisition unit, a number of the regions of the sheet for the acquisition of paper fingerprints corresponding to a number of images printed on the sheet after dividing a dimension of the sheet by a number representing the imposition information;
    a paper fingerprint information acquisition unit that acquires the paper fingerprints, a number of which corresponds to the number of images printed on the sheet after dividing the dimension of the sheet by a number representing the imposition information, in regions calculated by said paper fingerprint acquisition region calculation unit;
    a coded information printing unit that codes the paper fingerprint acquired by said paper fingerprint information acquisition unit and printing the coded information on the sheet; and
    an error report unit that reports an error when it is impossible to obtain a fingerprint on at least one of the acquisition regions existing on each of a plurality of pieces of paper obtained by cutting the sheet.

5. The image processing apparatus according to claim 4, wherein said paper fingerprint information acquisition unit corrects the coordinates of a position of at least one of the acquisition regions of the paper fingerprint on the basis of the imposition information.

6. The image processing apparatus according to claim 4, wherein said paper fingerprint acquisition region calculation unit calculates said regions on the basis of an effective print area and a shift width in cutting of the sheet in the region calculation.

7. The image processing apparatus according to claim 4, wherein said coded information printing unit warns the user when the coded information can not be printed in one of the calculated regions.

8. A control method of an image processing apparatus comprising:
    an imposition information acquisition step acquiring imposition information;
    a paper fingerprint acquisition region calculation step calculating a plurality of regions of a sheet for the acquisition of paper fingerprints according to the imposition information acquired by said imposition information acquisition step, a number of the regions of the sheet for the acquisition of paper fingerprints corresponding to a number of images printed on the sheet after dividing a dimension of the sheet by a number representing the imposition information; and
    a paper fingerprint information acquisition step acquiring the paper fingerprints, a number of which corresponds to the number of images printed on the sheet after dividing the dimension of the sheet by a number representing the imposition information, according to the regions calculated by said paper fingerprint acquisition region calculation step; and
    an error report step that reports an error when it is impossible to obtain a fingerprint on at least one of the acquisition region existing on each of a plurality of pieces of paper obtained by cutting the sheet.

9. The control method of the image processing apparatus according to claim 8, wherein said paper fingerprint information acquisition step corrects the coordinates of a position of at least one of the acquisition regions of the paper fingerprint.

10. The control method of the image processing apparatus according to claim 8, wherein said paper fingerprint acquisition region calculation step calculates said regions on the basis of an effective print area and a shift width in cutting of the sheet in the region calculation.

11. A control method of an image processing apparatus comprising:
   an imposition information acquisition step acquiring imposition information;
   a paper fingerprint acquisition region calculation step calculating a plurality of regions of a sheet for the acquisition of paper fingerprints according to the imposition information acquired by said imposition information acquisition step, a number of the regions of the sheet for the acquisition of paper fingerprints corresponding to a number of images printed on the sheet after dividing a dimension of the sheet by a number representing the imposition information;
   a paper fingerprint information acquisition step acquiring the paper fingerprints, a number of which corresponds to the number of images printed on the sheet after dividing the dimension of the sheet by a number representing the imposition information, according to the regions calculated by said paper fingerprint acquisition region calculation step;
   a coded information printing step coding the paper fingerprint acquired by said paper fingerprint information acquisition unit and printing the coded information on the sheet; and
   an error report step that reports an error when it is impossible to obtain a fingerprint on at least one of the acquisition regions existing on each of a plurality of pieces of paper obtained by cutting the sheet.

12. The control method of the image processing apparatus according to claim 11, wherein said paper fingerprint information acquisition step corrects the coordinates of a position of at least one of the acquisition regions of the paper fingerprint on the basis of the imposition information.

13. The control method of the image processing apparatus according to claim 11, wherein said paper fingerprint acquisition region calculation step calculates said regions on the basis of an effective print area and a shift width in cutting of the sheet in the region calculation.

14. The control method of the image processing apparatus according to claim 11, wherein said coded information printing step warns the user when the coded information can not be printed in one of the calculated regions.

15. A non-transitory computer readable storage medium for storing a program that executes the control method of the image processing apparatus according to claim 8.

* * * * *